United States Patent
Ahn et al.

(10) Patent No.: US 9,503,836 B2
(45) Date of Patent: Nov. 22, 2016

(54) MOBILE COMMUNICATION SYSTEM, MOBILE TERMINAL AND CONTROLLING METHOD THEREOF

(71) Applicant: LG ELECTRONICS INC, Seoul (KR)

(72) Inventors: Youngjin Ahn, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 240 days.

(21) Appl. No.: 14/494,292

(22) Filed: Sep. 23, 2014

(65) Prior Publication Data

US 2015/0087289 A1  Mar. 26, 2015

(30) Foreign Application Priority Data

Sep. 24, 2013 (KR) .......................... 10-2013-0113147

(51) Int. Cl.
*H04M 3/00* (2006.01)
*H04W 4/00* (2009.01)
*H04W 12/06* (2009.01)

(52) U.S. Cl.
CPC ............. *H04W 4/001* (2013.01); *H04W 12/06* (2013.01); *H04L 2463/082* (2013.01)

(58) Field of Classification Search
CPC ... H04W 4/001; H04W 12/06; H04W 12/00; H04L 2463/082; H04L 9/32; G06F 8/61

USPC .................. 455/410, 411, 419, 420; 713/170
See application file for complete search history.

(56) References Cited

U.S. PATENT DOCUMENTS

| | | | | |
|---|---|---|---|---|
| 2014/0358734 A1* | 12/2014 | Sehgal | ............... | G06Q 30/0641 705/27.1 |
| 2015/0193216 A1* | 7/2015 | Li | .................... | H04M 1/72525 717/175 |
| 2015/0253885 A1* | 9/2015 | Kagan | .................. | G06F 3/0482 368/10 |

* cited by examiner

*Primary Examiner* — Wayne Cai
(74) *Attorney, Agent, or Firm* — Birch, Stewart, Kolasch & Birch, LLP

(57) ABSTRACT

A method of processing data in a first mobile terminal, and which includes registering, via a controller of the first mobile terminal, a second mobile terminal as a master device and the first terminal as a slave device; storing, via a memory associated with the first mobile terminal, status information indicating previous success or non-success of receiving a positive response from the second mobile terminal for a request to activate an application on the first mobile terminal; transmitting, via a wireless communication unit of the first mobile terminal, an application activation request signal to the second mobile terminal based on the stored status information; receiving, via the wireless communication unit, a response signal corresponding to the application activation request signal from the second mobile terminal; and activating, via the controller, the application in response to the received response signal.

20 Claims, 29 Drawing Sheets

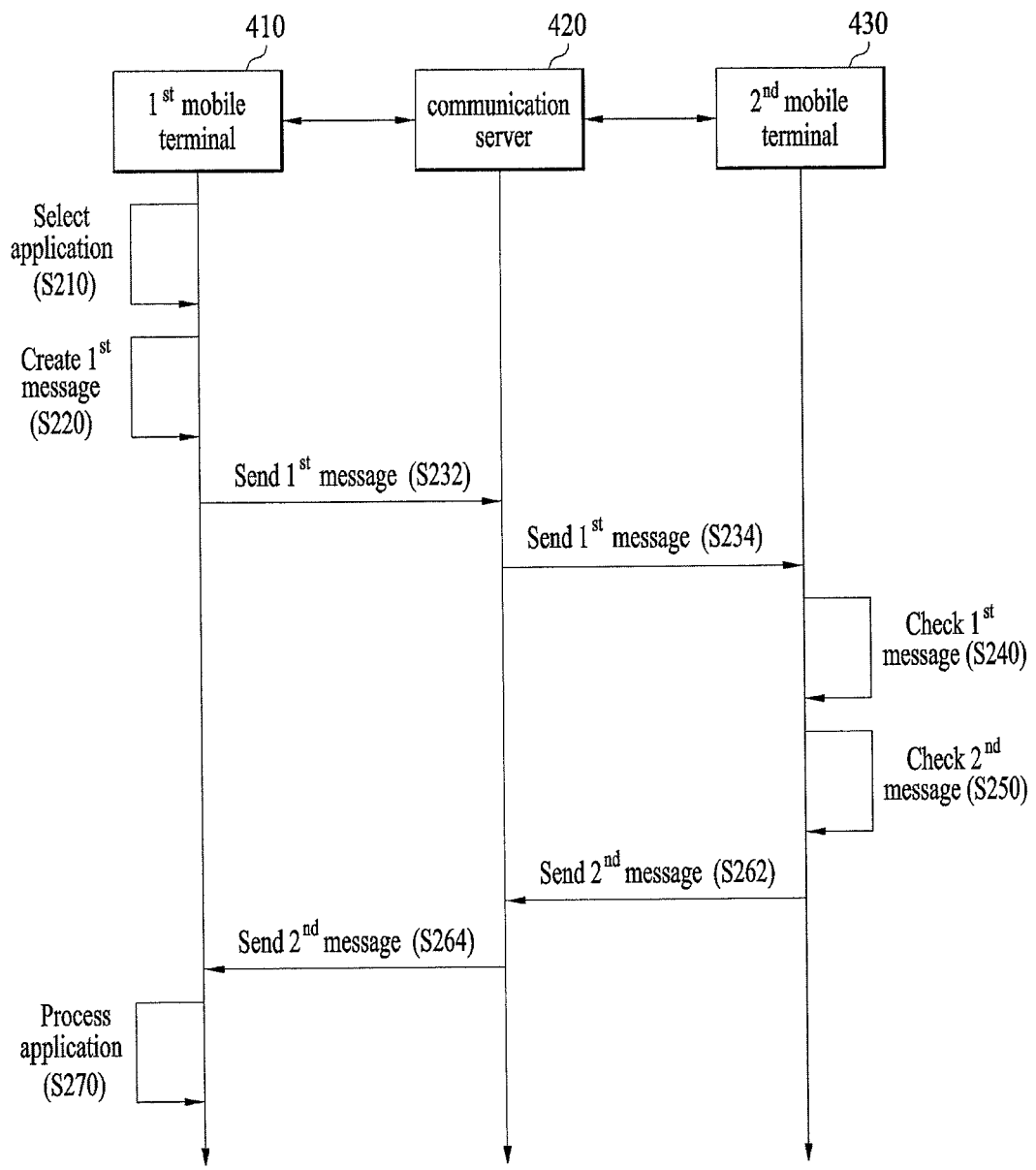

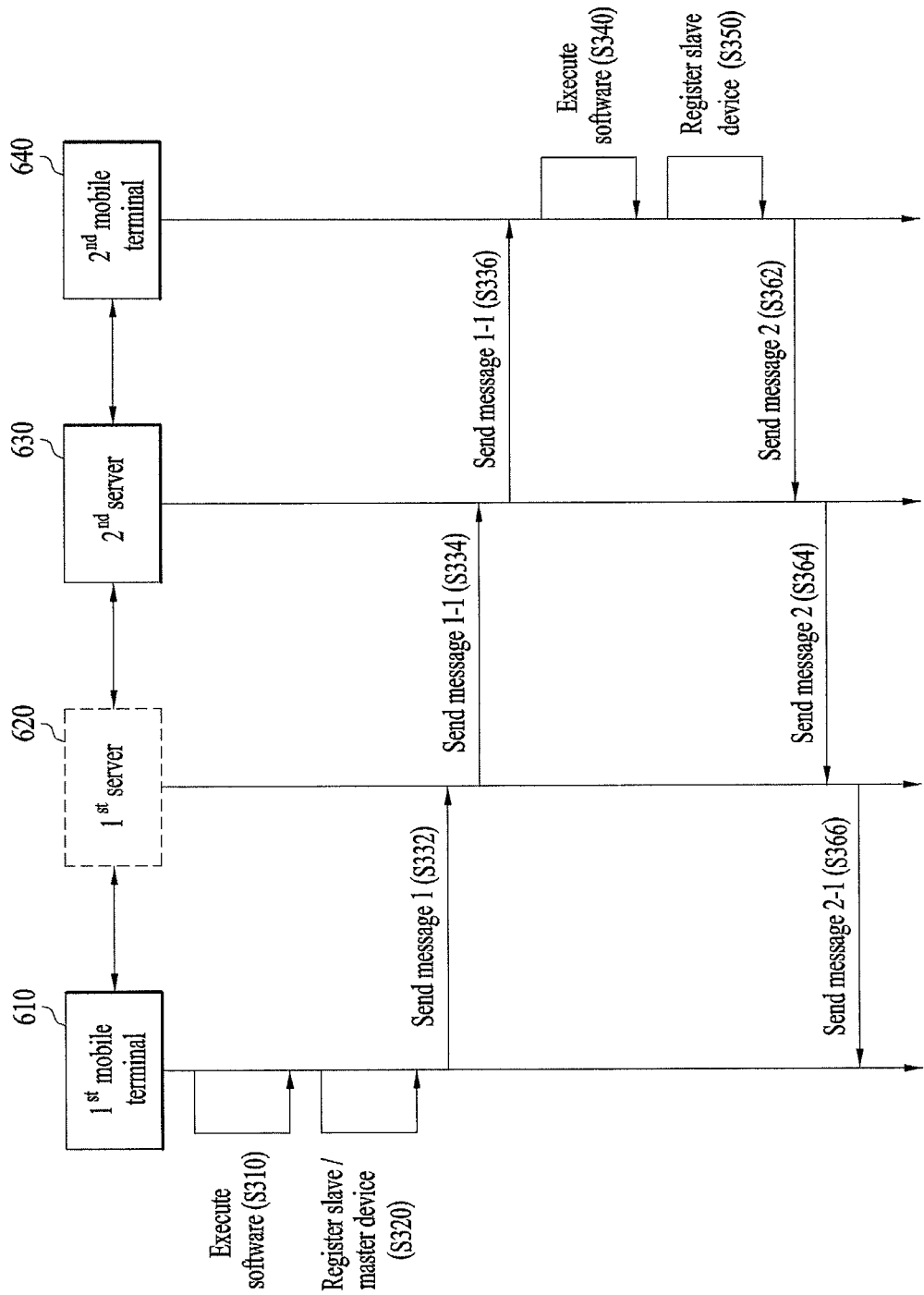

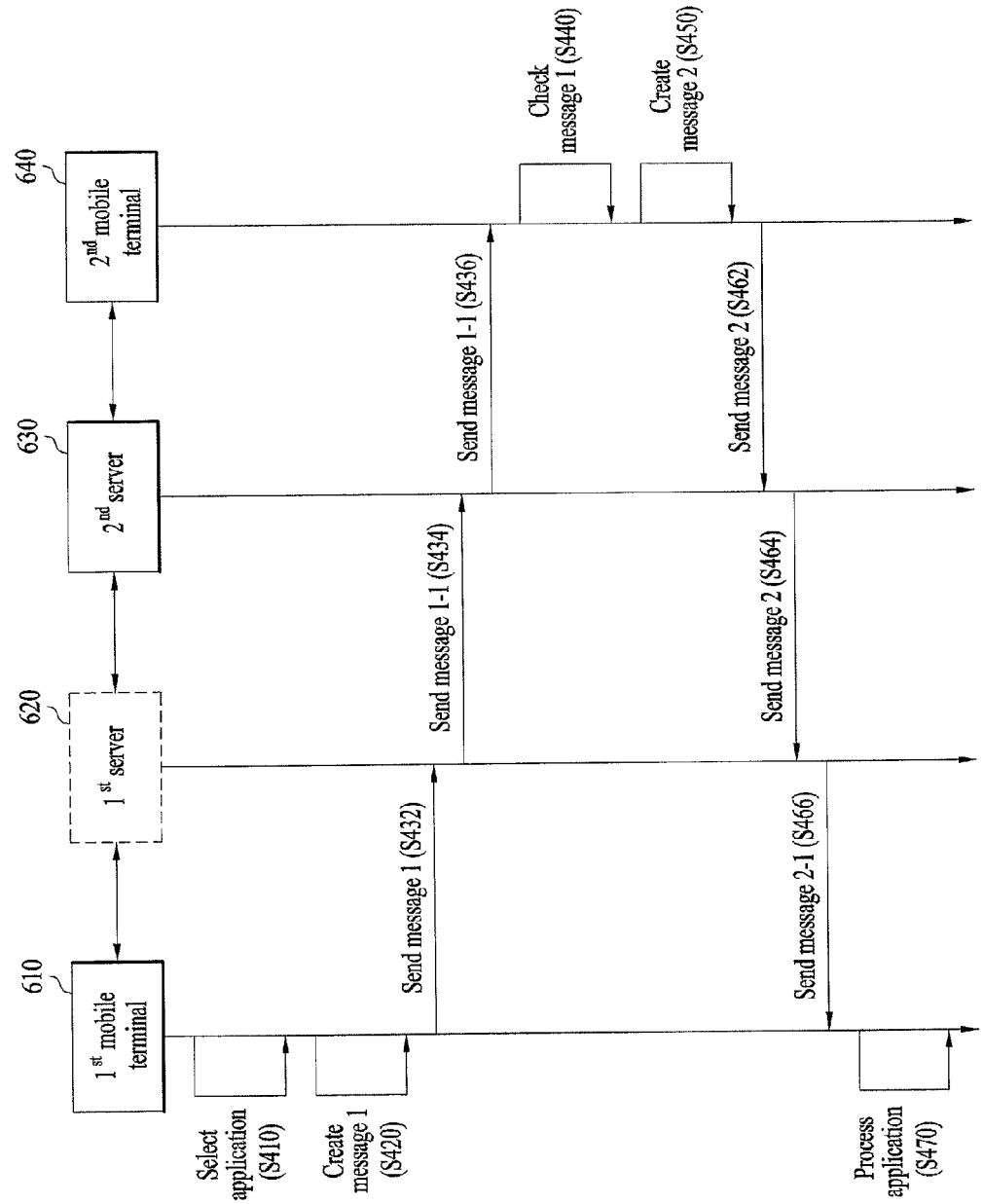

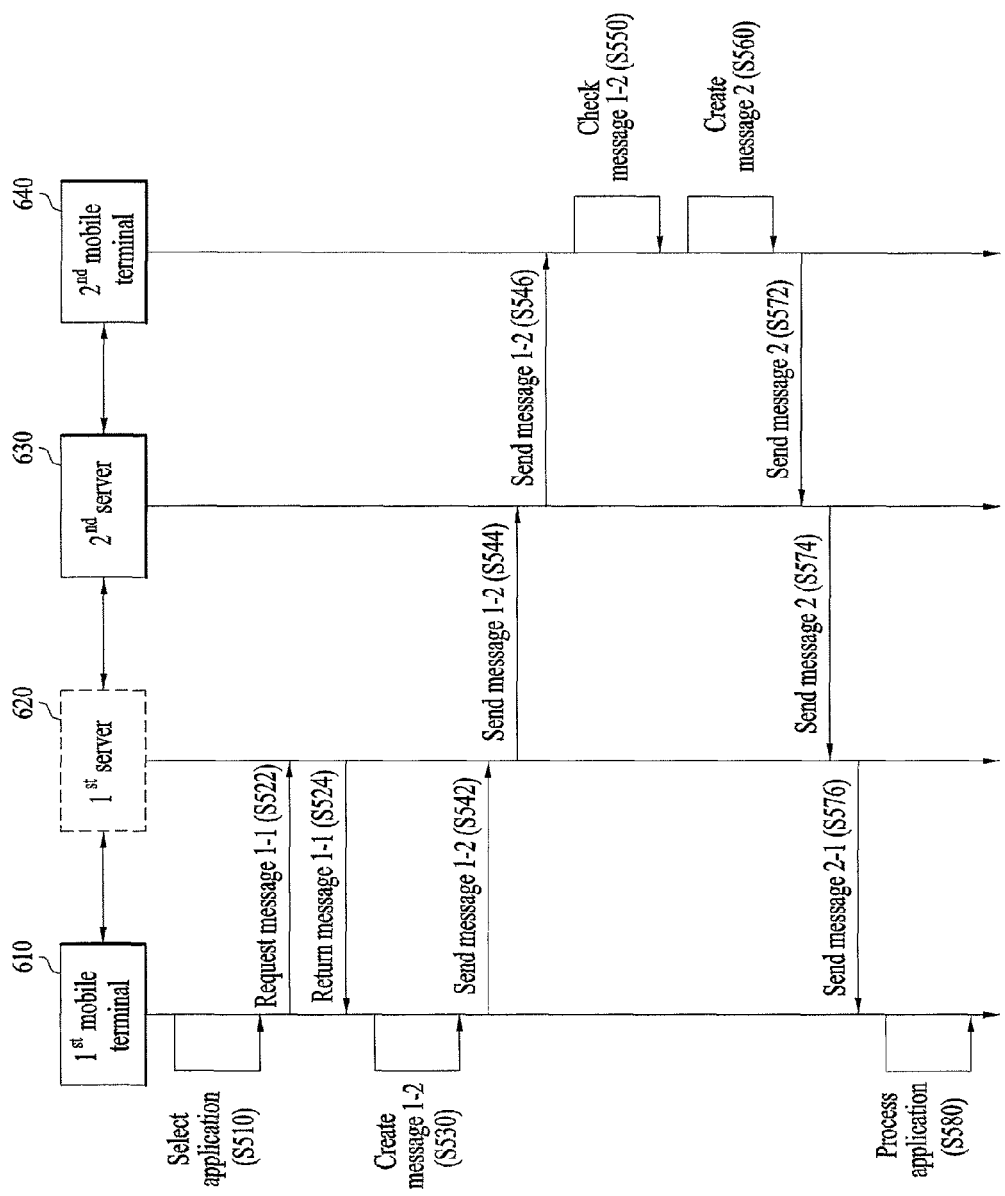

FIG. 9

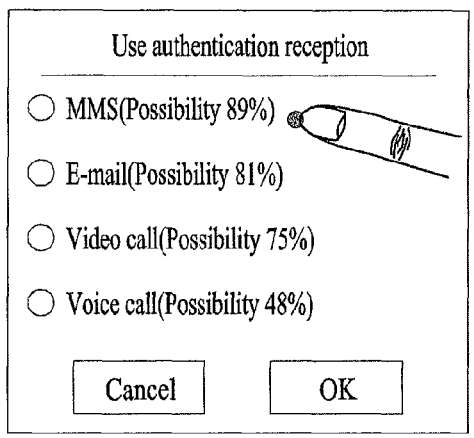

Use authentication reception
- ○ MMS(Possibility 89%)
- ○ E-mail(Possibility 81%)
- ○ Video call(Possibility 75%)
- ○ Voice call(Possibility 48%)

[ Cancel ]  [ OK ]

FIG. 10

| No | Application | Date | Time | Day | Acceptance | Method |
|---|---|---|---|---|---|---|
| 1 | magumagu 2013 | 120311 | 16:17 | Monday | Yes | MMS |
| 2 | magumagu 2013 | 120324 | 20:09 | Friday | Yes | MMS |
| 3 | magumagu 2013 | 120501 | 19:10 | Monday | Yes | MMS |
| 4 | Pooq | 120708 | 20:12 | Friday | No | Voice Call |
| 5 | magumagu 2013 | 120923 | 19:12 | Thursday | Yes | Voice Call |
| 6 | Pooq | 121023 | 18:22 | Friday | Yes | MMS |
| 7 | magumagu 2013 | 130102 | 21:33 | Saturday | No | Voice Call |

FIG. 11
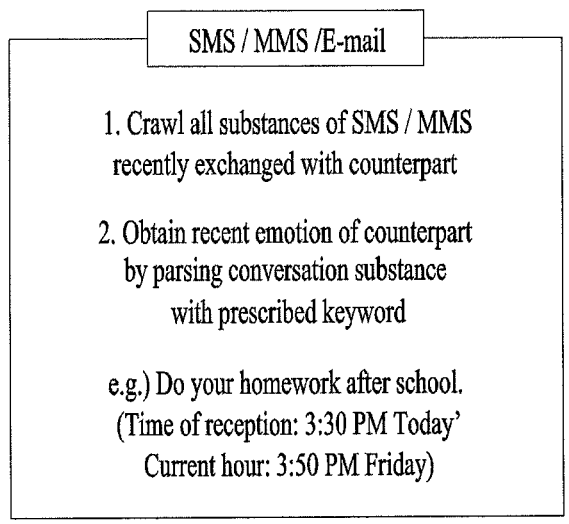
(a)
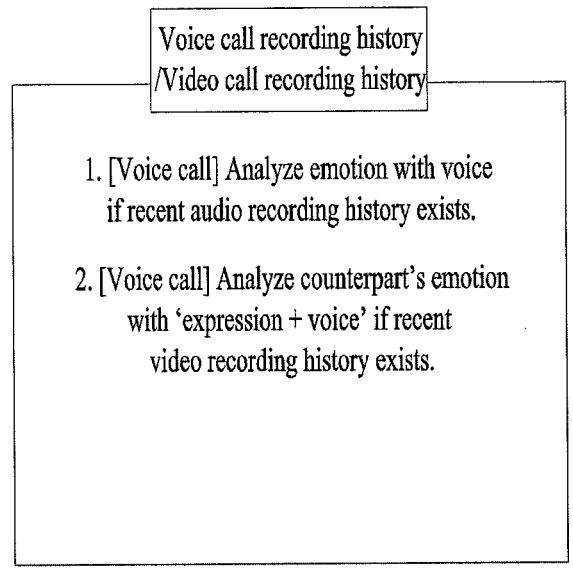
(b)

FIG. 12
1210
(a)
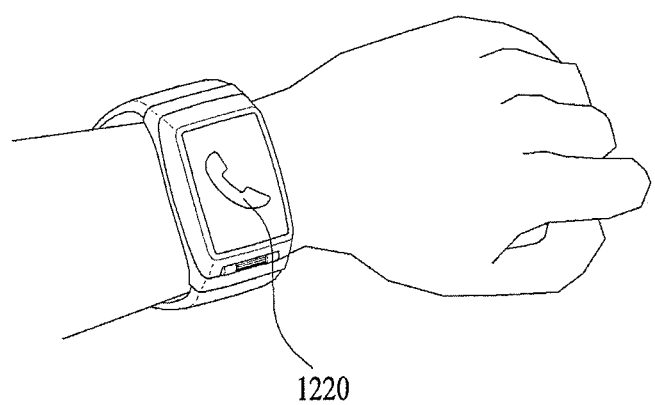
1220
(b)

FIG. 13

|  | Father | Mother |  |
|---|---|---|---|
| Agreement /Denial | ○ | ○ | Application activation possible<br>Use time increase possible<br>High probability of agreement in case of a later authentication request |
| | × | ○ | Conditional application activation available<br>Use time decrease |
| | ○ | × | Possible to lead to terminate notification provision<br>Request agreement again |
| | × | × | Application activation impossible<br>Notification in case of a later authentication request |

(a)

(b)

| Parents' status | Icon outline color |
|---|---|
| Very good | |
| Good | |
| Normal | |
| Bad | |
| Very bad | |

(a)

(b)

| Parents' status | Phenomenon |  |
|---|---|---|
| Very good | Icon shines in green | |
| Good | | |
| Normal | | |
| Bad | | |
| Very bad | Icon shines in red | |

(a)

(b)

FIG. 18
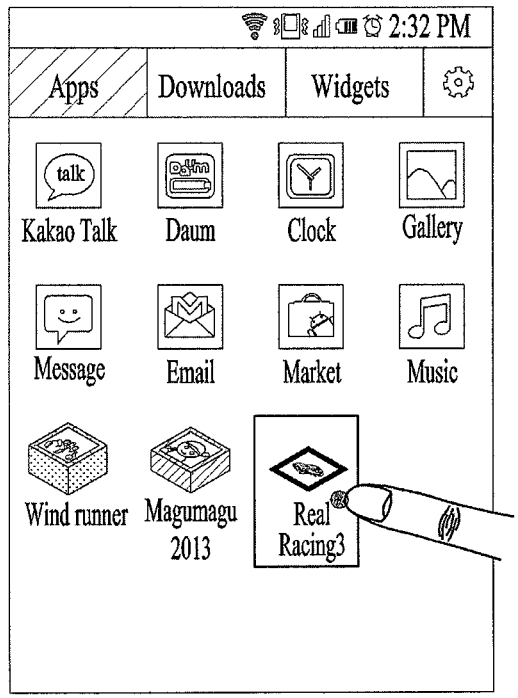
(a)
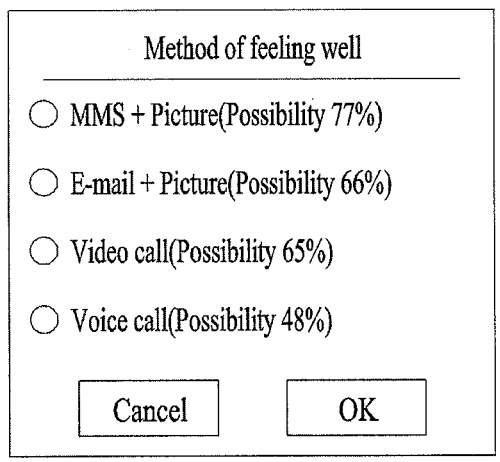
(b)
(c)

Very bad bad

Normal

Good

Very good (a)

| 📱 LG Device authentication | |
|---|---|
| Son<br>Professional baseball games 2013<br>(15:30 ~ 17:30) | 😊 |
| Son<br>Internet (08:30 ~ 09:00) | 😊 |
| Daughter<br>Music player (22:00 ~ 24:00) | 🦉 |
| Son<br>Music player (21:30 ~ 23:00) | 😊 |

(b)

FIG. 20
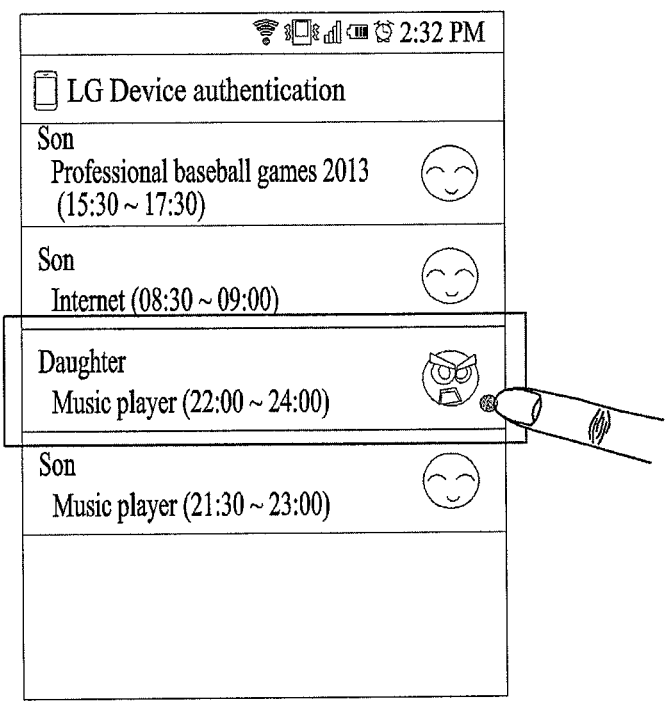
(a)
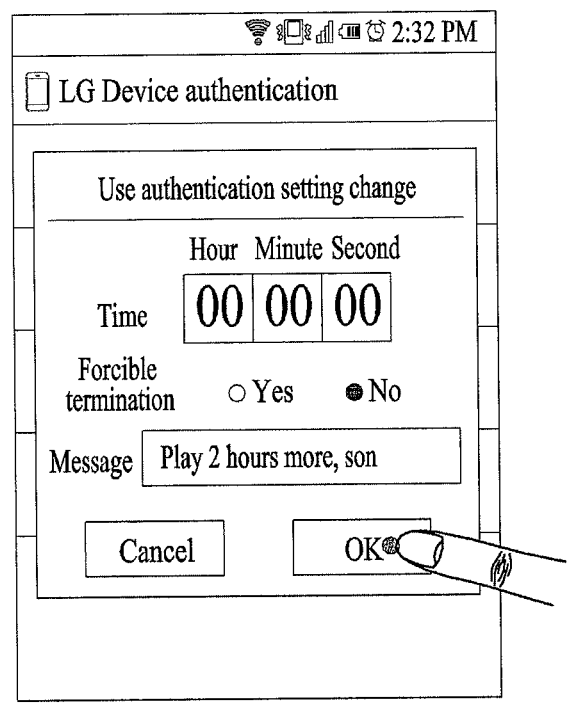
(b)

| Parent's status | Photo to overlay |
|---|---|
| Good | |
| Normal | |
| Bad | |

(a)

(b)

FIG. 26
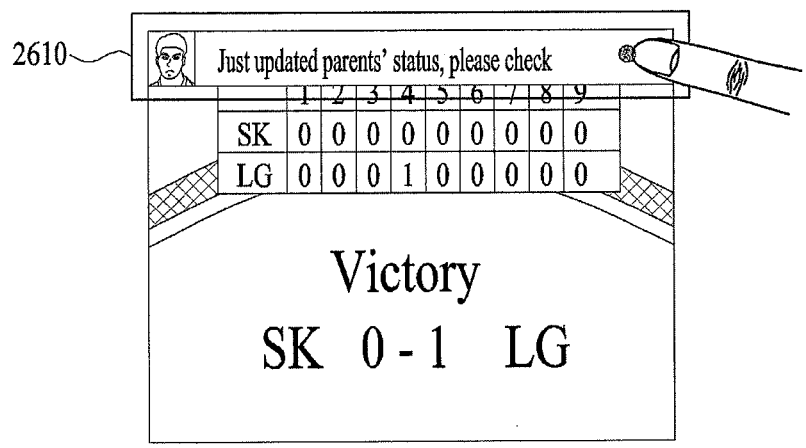
(a)
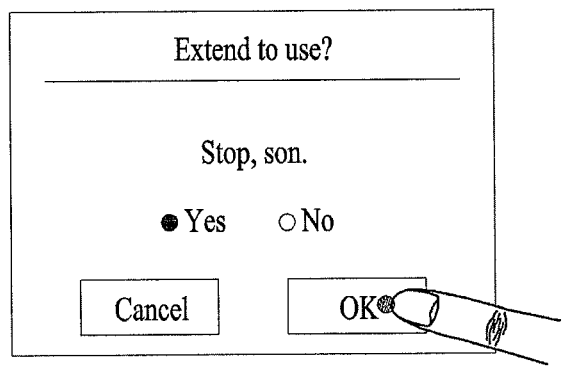
(b)

FIG. 27
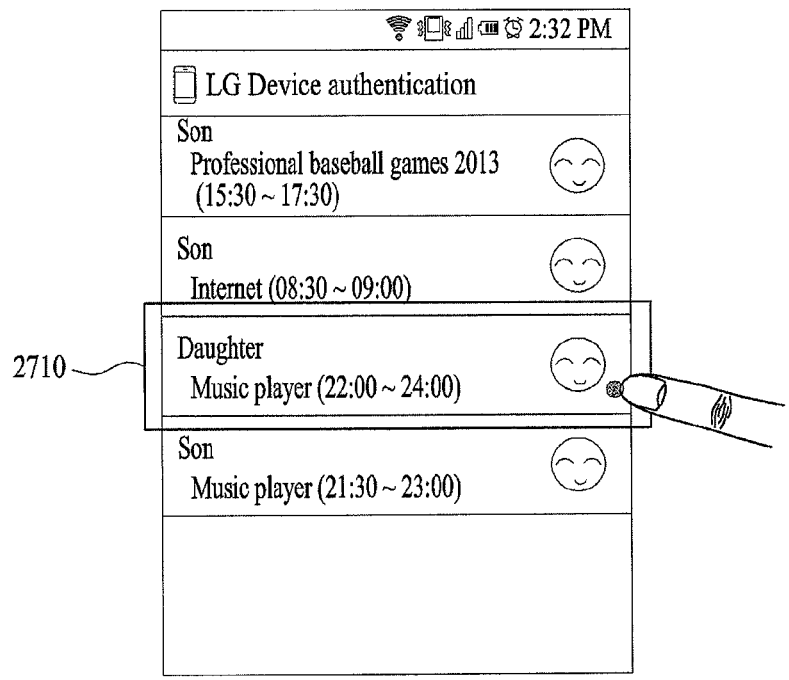
(a)
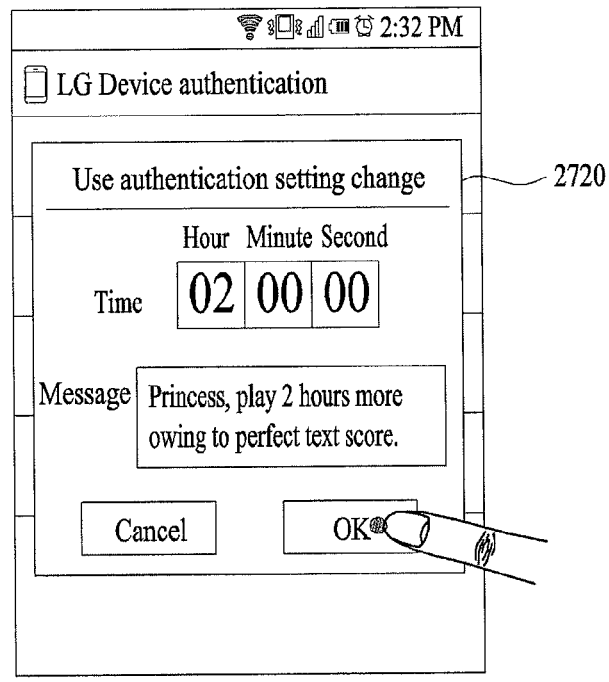
(b)

FIG. 28
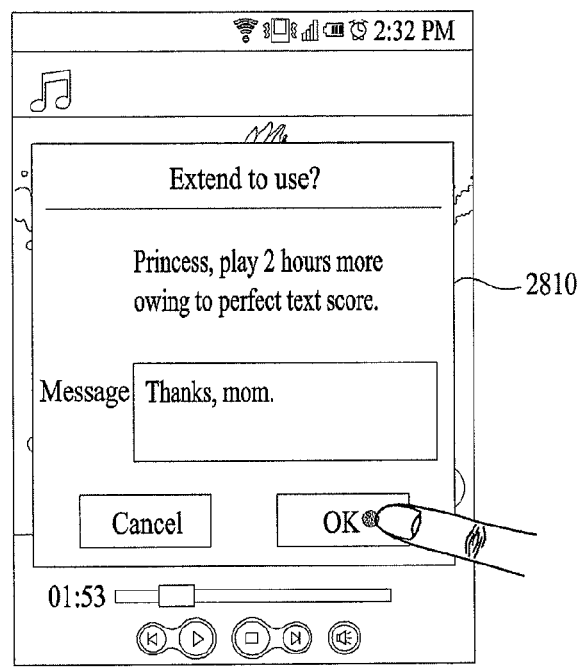
(a)
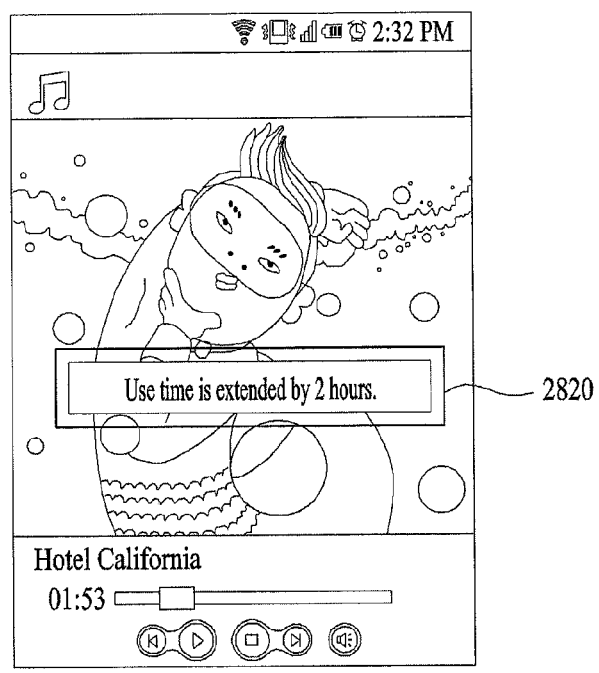
(b)

FIG. 29
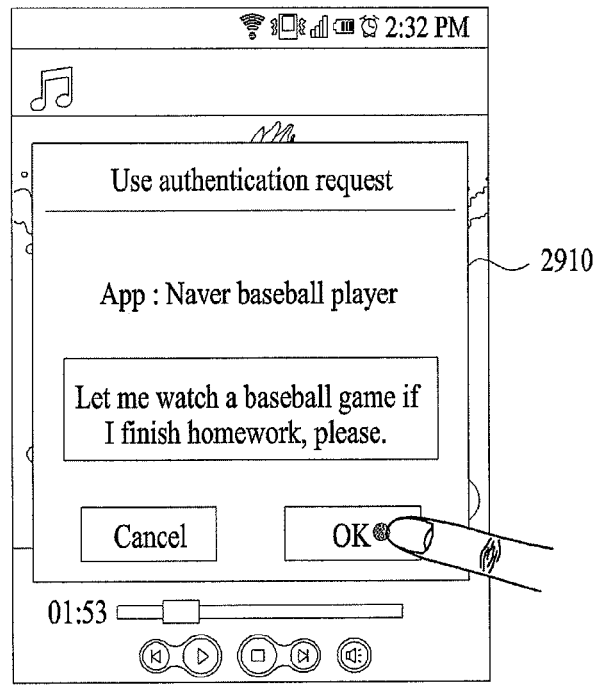
(b)
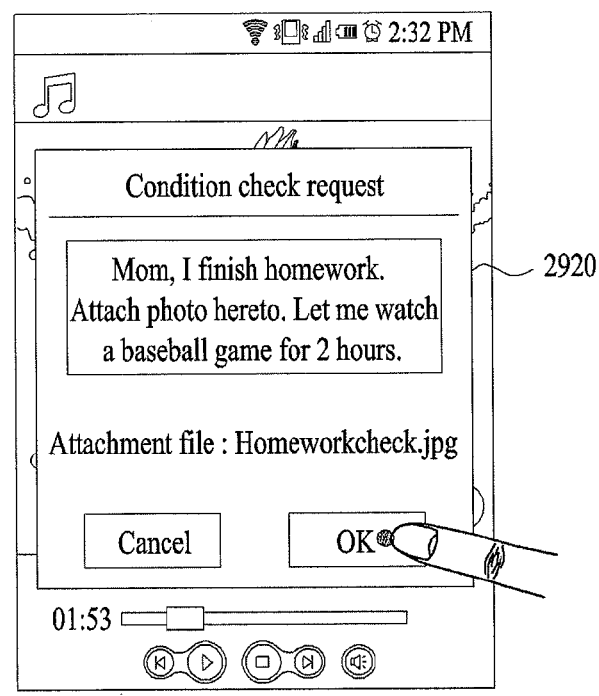
(b)

FIG. 30
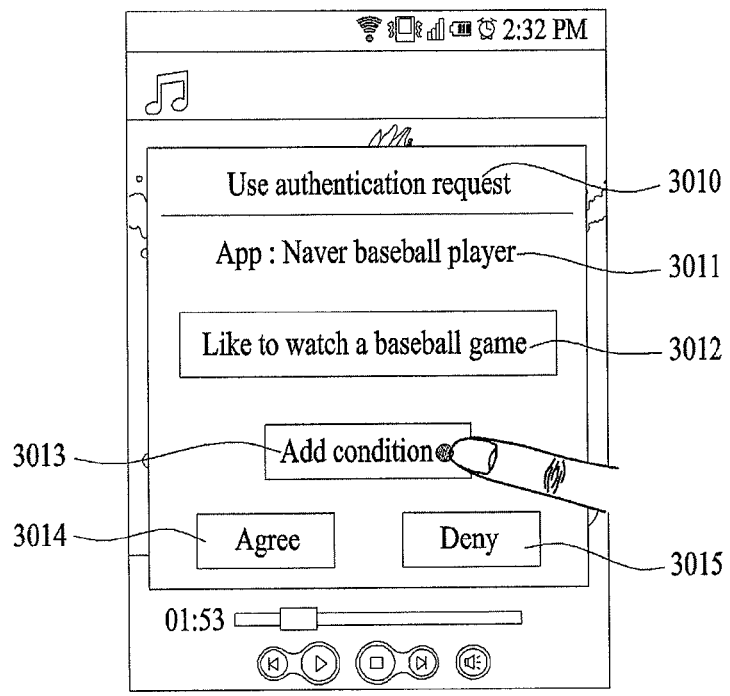
(b)
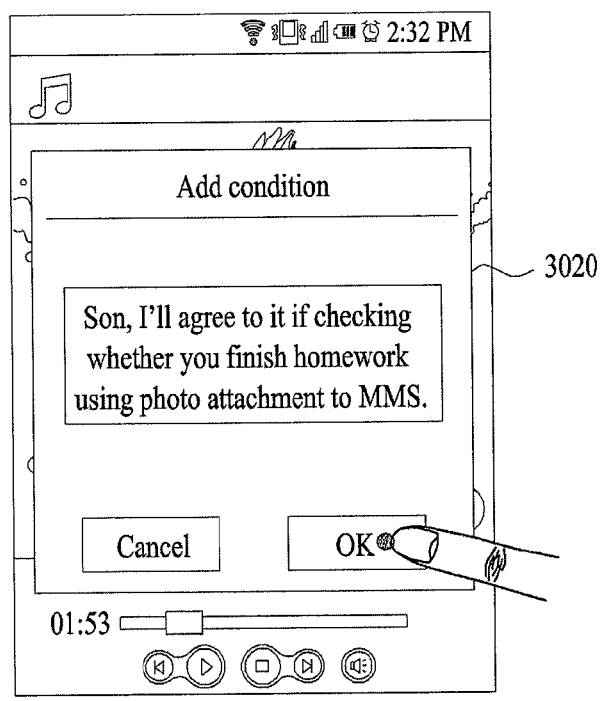
(b)

FIG. 32
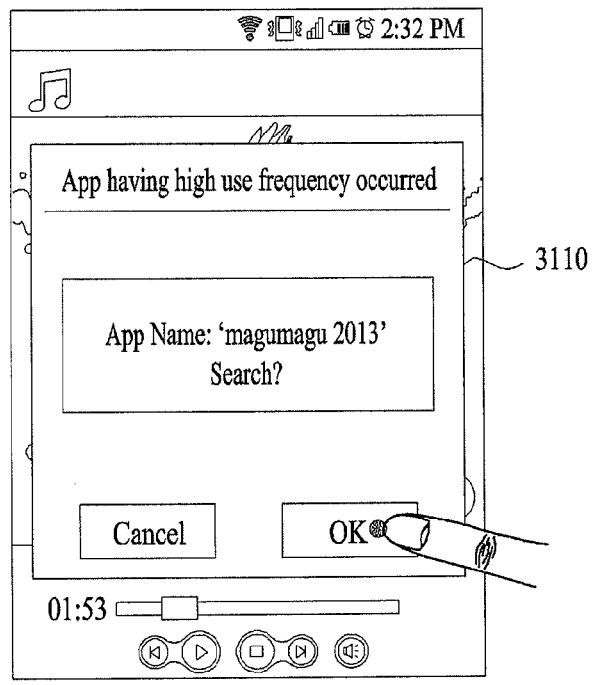
(a)
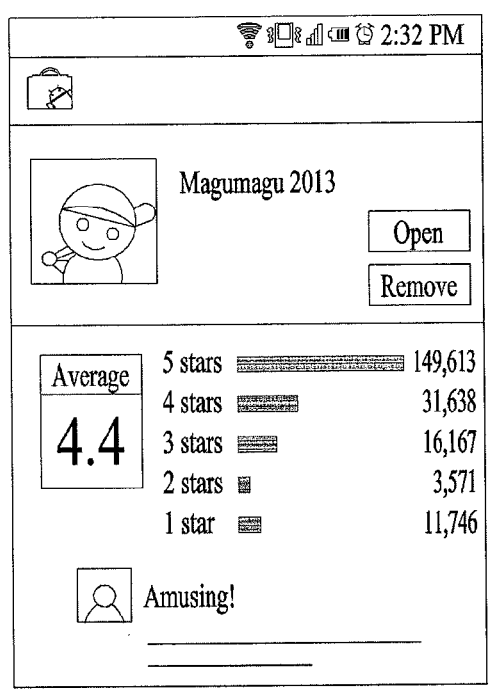
(b)

MOBILE COMMUNICATION SYSTEM, MOBILE TERMINAL AND CONTROLLING METHOD THEREOF

Pursuant to 35 U.S.C. §119(a), this application claims priority to Korean Patent Application No. 10-2013-0113147 filed on Sep. 24, 2013 in Korea, the entire contents of which is hereby incorporated by reference in its entirety.

BACKGROUND OF THE INVENTION

Field of the Invention

The present invention relates to a mobile communication system, mobile terminal and controlling method thereof.

Discussion of the Related Art

Terminals may be generally classified as mobile/portable terminals or stationary terminals. Mobile terminals may also be classified as handheld terminals or vehicle mounted terminals. Mobile terminals have also become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

However, as mobile terminals have increased in popularity, various side effects have been caused. Recently, various applications or web services are provided through a mobile terminal. Thus, compared to a broadcast service or a web service through a personal computer (PC), many services are performed recklessly without restrictions due to legal loopholes of laws and regulations. For instance, many parents are concerned, because they do not know what kinds of applications are used by their children, how long their children use their mobile terminals in a day, and the like. Since children or juveniles tend to be seriously immersed in mobile terminals or applications running in the mobile terminals, they are vulnerable to communication blocks between family members or other environments.

To solve such problems, the demand for establishing a system or service for educating the bond between terminal users and the control ability through interactive communications between mobile terminals is increasingly rising. However, since a certain system or service enables an authority to be established between mobile terminals like the relationship between a controlling party and a controlled party, it may cause another problem. Moreover, since real-time statuses or situations of mobile terminal users are not taken into consideration, the mobile terminal users may feel inconvenient and uncomfortable.

SUMMARY OF THE INVENTION

Accordingly, embodiments of the present invention are directed to a mobile communication system, mobile terminal and controlling method thereof that substantially obviate one or more problems due to limitations and disadvantages of the related art.

One object of the present invention is to provide a mobile communication system, mobile terminal and controlling method thereof, by which data communications are facilitated.

To achieve these objects and other advantages and in accordance with the purpose of the invention, as embodied and broadly described herein, a method of processing data between a plurality of mobile terminals according to an embodiment of the present invention includes registering a specific mobile terminal as a master device, receiving a user input, creating status information on the mobile terminal registered as the master device by collecting information on the mobile terminal registered as the master device, transmitting an application activation request signal containing the created status information to the mobile terminal registered as the master device, receiving a response signal corresponding to the application activation request signal from the mobile terminal registered as the master device, and activating an application in response to the received response signal.

In another aspect of the present invention, a mobile terminal, which processes data with a specific mobile terminal registered as a master device, according to an embodiment of the present invention includes a user interface unit configured to receive a user input, a controller controlling the specific mobile terminal to be registered as the master device, the controller creating status information on the mobile terminal registered as the master device by collecting information on the mobile terminal registered as the master device, a transmitting unit configured to transmit an application activation request signal containing the created status information to the mobile terminal registered as the master device, a signal receiving unit configured to receive a response signal corresponding to the application activation request signal from the mobile terminal registered as the master device, and an output unit configured to output an application activated screen in response to the received response signal.

In further aspect of the present invention, a mobile communication system, which processes data between a plurality of mobile terminals, according to an embodiment of the present invention includes a first mobile terminal registered as a slave device through software execution, a second mobile terminal registered as a master device through the software execution, and a communication server transceiving the data between the first mobile terminal and the second mobile terminal, the first mobile terminal further including a controller creating status information on the second mobile terminal by collecting information on the second mobile terminal, a transmitting unit configured to transmit an application activation request signal containing the created status information to the mobile terminal registered as the master device, a signal receiving unit configured to receive a response signal corresponding to the application activation request signal from the mobile terminal registered as the master device, and an output unit configured to output an application activated screen in response to the received response signal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 5 is a flowchart illustrating a method of processing an application between mobile terminals according to one embodiment of the present invention;

FIG. 6 is a flowchart illustrating a method of processing an application between mobile terminals according to another embodiment of the present invention;

FIG. 7 is a flowchart illustrating a method of processing an application between mobile terminals according to further embodiment of the present invention;

FIG. 8 is a flowchart illustrating a method of processing an application between mobile terminals according to another further embodiment of the present invention;

FIG. 9 is a diagram illustrating status information collecting method according to one embodiment of the present invention;

FIG. 10 is a diagram illustrating basic data for status information creation shown in FIG. 9;

FIG. 11 is a diagram illustrating status information collecting method according to another embodiment of the present invention;

FIG. 12 is a diagram illustrating status information collecting method according to a further embodiment of the present invention;

FIG. 13 is a diagram illustrating an application processing method for a plurality of mobile terminals;

FIG. 18 is a diagram illustrating a method of sending a message depending on status information according to one embodiment of the present invention;

FIG. 19 and FIG. 20 are diagrams illustrating an application UI/UX provided depending on status information in a mobile terminal;

FIG. 26 is a diagram illustrating a processing method depending on an application use termination between mobile terminals;

FIG. 27 and FIG. 28 are diagrams illustrating a processing method depending on an additional application use authentication between mobile terminals;

FIG. 29 and FIG. 30 are diagrams illustrating a scenario for a conditional authentication request or a conditional agreement grant for an authentication request or an agreement grant in mobile terminals; and FIG. 31 and FIG. 32 are diagrams illustrating a process for controlling an application in the aforementioned master-slave device registered mobile terminals.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. It will be understood that although the terms first, second, etc. may be used herein illustrating various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
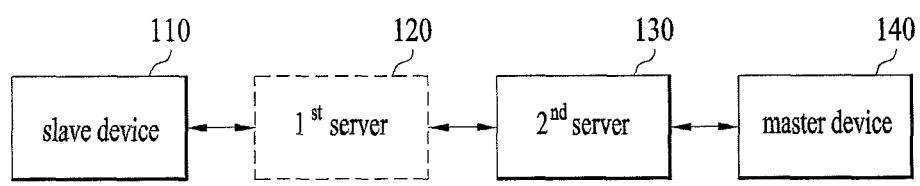
FIG. 1 is a schematic block diagram of a wireless communication system including a slave device and a master device.

FIG. 1 is a schematic block diagram of a wireless communication system including a slave device 110 and a master device 140. For example, a mobile communication system for processing data between a plurality of mobile terminals may include a first mobile terminal registered as a slave device through software activation, a second mobile terminal registered as a master device through software activation, and a communication server configured to transmit and receive data between the first mobile terminal and the second mobile terminal.

In particular, the first mobile terminal can process data between a plurality of mobile terminals by including a controller creating status information on the second mobile terminal by collecting information on the second mobile terminal, a transmitting unit configured to transmit an application activation request signal containing the created status information to the mobile terminal registered as the master device, a signal receiving unit configured to receive a response signal corresponding to the application activation request signal from the mobile terminal registered as the master device, and an output unit configured to output an application activated screen in response to the received response signal.

In the following description, the mobile communication system is explained in detail with reference to FIG. 1. Referring to FIG. 1, a mobile communication system includes a slave device 110, a first server 120, a second server 130 and a master device 140. In this instance, each of the slave device 110 and the master device 140 may include at least one of the aforementioned mobile or fixed terminals. Yet, for clarity of the following description, assume that each of the slave device 110 and the master device 140 includes the mobile terminal.

Further, the first server 120 may mean a relay server or a crawling server that relays or processes data between the slave device 110 and the master device 140 if necessary. For example, the first server 120 may include a server or a cloud server provided by a manufacturer of the mobile terminal. The second server 130 may include a communication server configured to provide a network environment according to a communication protocol to enable data communications between the slave device 110 and the master device 140. The above-mentioned substance represents one embodiment of the present invention only, by which technical idea of the present invention is not limited.

A method of processing data between the slave mobile terminal 110 and the master mobile terminal 140 in the aforementioned mobile communication system shall be described detail with reference to FIGS. 4 to 8 later. However, reference is now made to FIGS. 2 and 3, where FIG. 2 is a block diagram of a mobile terminal in accordance with the present invention, and FIG. 3 includes conceptual views of one example of the mobile terminal, viewed from different directions.

Figure 2:
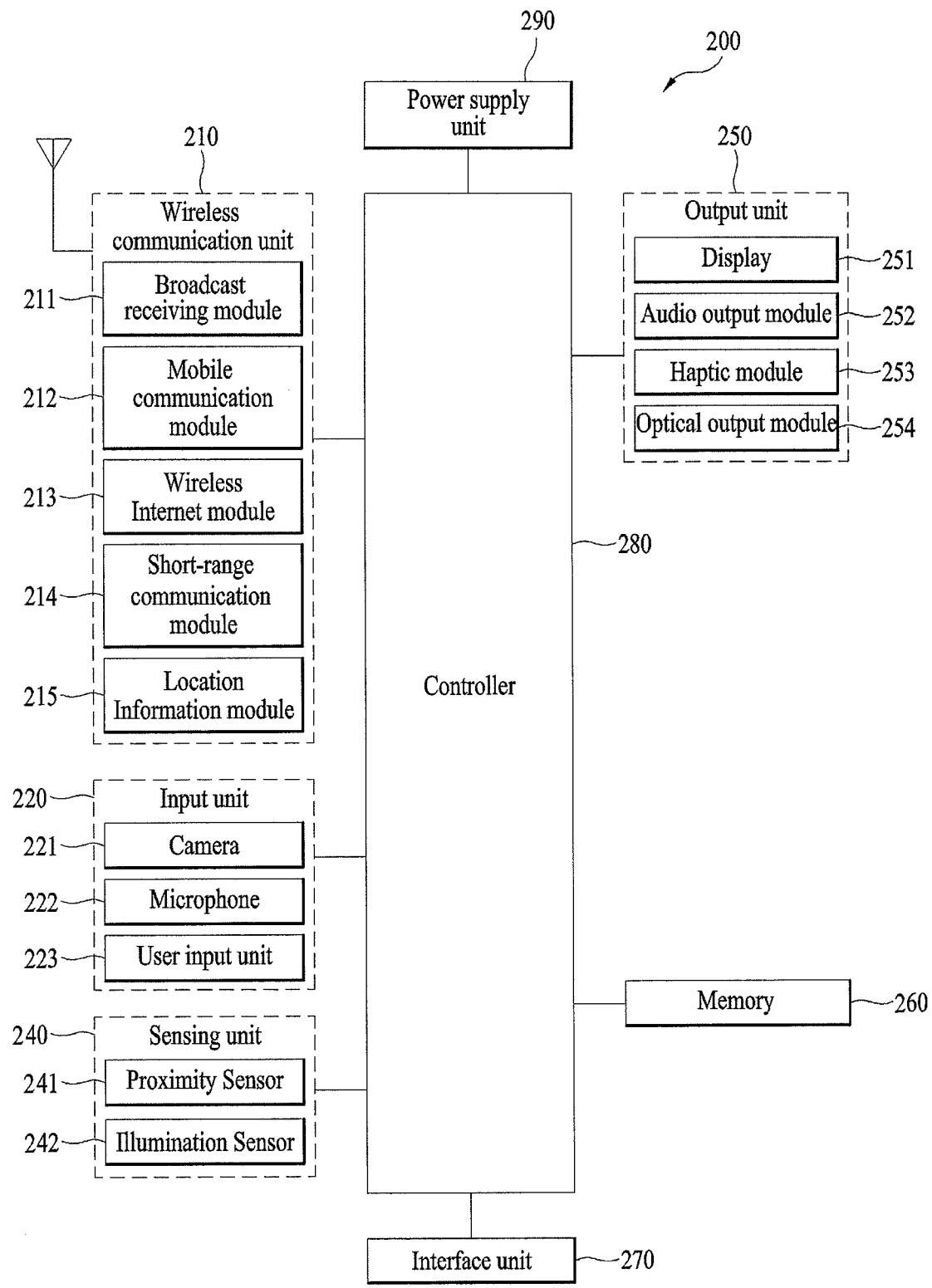
FIG. 2 is a block diagram of a mobile terminal according to an embodiment of the present invention.
Figure 3A:
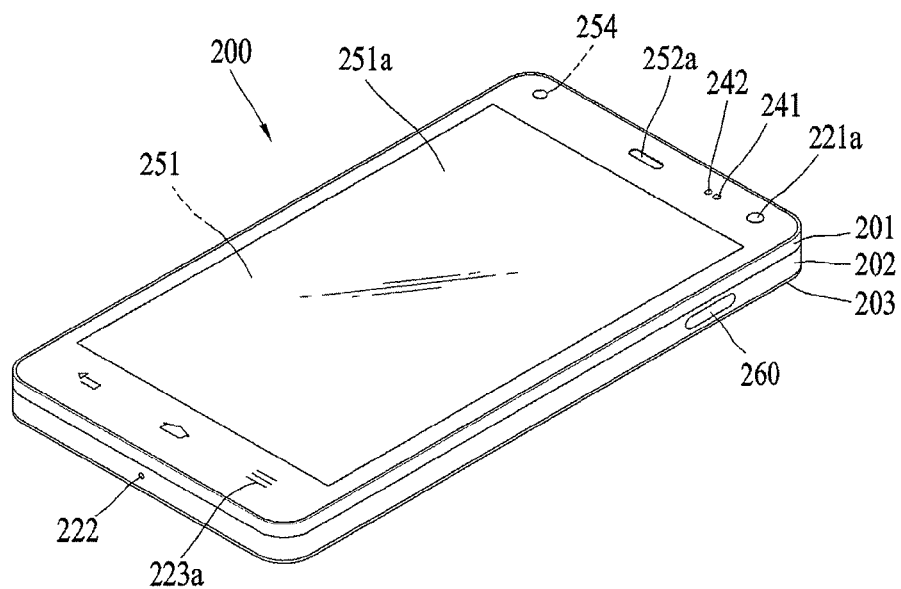
FIG. 3A and FIG. 3B includes conceptual views illustrating one example of the mobile terminal viewed from different directions.
Figure 3B:
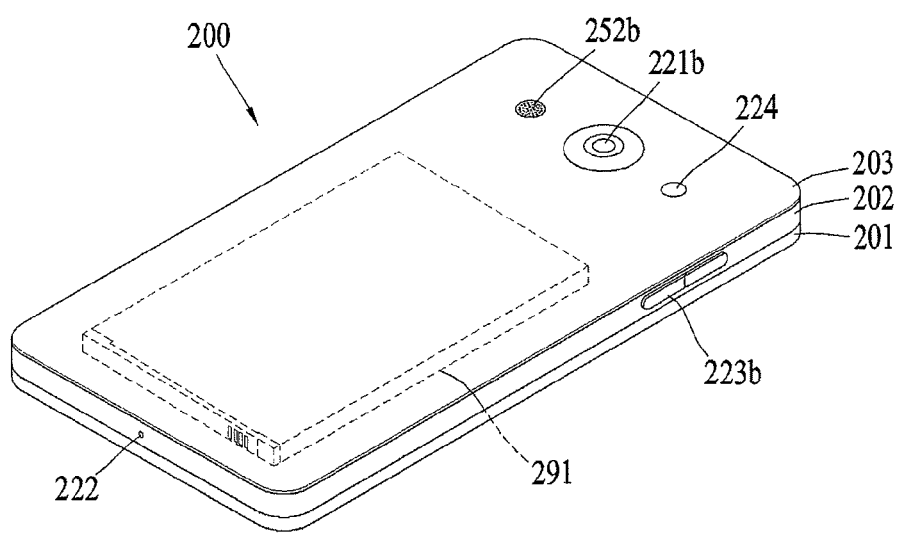

Reference is now made to FIGS. 2-3, where FIG. 2 is a block diagram of a mobile terminal in accordance with the present disclosure, and FIGS. 3A and 3B are conceptual views of one example of the mobile terminal, viewed from different directions.

The mobile terminal 200 is shown having components such as a wireless communication unit 210, an input unit 220, a sensing unit 240, an output unit 250, an interface unit 260, a memory 270, a controller 280, and a power supply unit 290. It is understood that implementing all of the illustrated components is not a requirement, and that greater or fewer components may alternatively be implemented.

Referring now to FIG. 2, the mobile terminal 200 is shown having wireless communication unit 210 configured with several commonly implemented components. For instance, the wireless communication unit 210 typically includes one or more components which permit wireless communication between the mobile terminal 200 and a wireless communication system or network within which the mobile terminal is located.

The wireless communication unit 210 typically includes one or more modules which permit communications such as wireless communications between the mobile terminal 200 and a wireless communication system, communications between the mobile terminal 200 and another mobile terminal, communications between the mobile terminal 200 and an external server. Further, the wireless communication unit 210 typically includes one or more modules which connect the mobile terminal 200 to one or more networks. To facilitate such communications, the wireless communication unit 210 includes one or more of a broadcast receiving module 211, a mobile communication module 212, a wireless Internet module 213, a short-range communication module 214, and a location information module 215.

The input unit 220 includes a camera 221 for obtaining images or video, a microphone 222, which is one type of audio input device for inputting an audio signal, and a user input unit 223 (for example, a touch key, a push key, a mechanical key, a soft key, and the like) for allowing a user to input information. Data (for example, audio, video, image, and the like) is obtained by the input unit 220 and may be analyzed and processed by controller 280 according to device parameters, user commands, and combinations thereof.

The sensing unit 240 is typically implemented using one or more sensors configured to sense internal information of the mobile terminal, the surrounding environment of the mobile terminal, user information, and the like. For example, in FIG. 2, the sensing unit 240 is shown having a proximity sensor 241 and an illumination sensor 242.

If desired, the sensing unit 240 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 221), a microphone 222, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 200 may be configured to utilize information obtained from sensing unit 240, and in particular, information obtained from one or more sensors of the sensing unit 240, and combinations thereof.

The output unit 250 is typically configured to output various types of information, such as audio, video, tactile output, and the like. The output unit 250 is shown having a display unit 251, an audio output module 252, a haptic module 253, and an optical output module 254.

The display unit 251 may have an inter-layered structure or an integrated structure with a touch sensor in order to facilitate a touch screen. The touch screen may provide an output interface between the mobile terminal 200 and a user, as well as function as the user input unit 223 which provides an input interface between the mobile terminal 200 and the user.

The interface unit 260 serves as an interface with various types of external devices that can be coupled to the mobile terminal 200. The interface unit 260, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 200 may perform assorted control functions associated with a connected external device, in response to the external device being connected to the interface unit 260.

The memory 270 is typically implemented to store data to support various functions or features of the mobile terminal 200. For instance, the memory 270 may be configured to store application programs executed in the mobile terminal 200, data or instructions for operations of the mobile terminal 200, and the like. Some of these application programs may be downloaded from an external server via wireless communication. Other application programs may be installed within the mobile terminal 200 at time of manufacturing or shipping, which is typically the case for basic functions of the mobile terminal 200 (for example, receiving a call, placing a call, receiving a message, sending a message, and the like). It is common for application programs to be stored in the memory 270, installed in the mobile terminal 200, and executed by the controller 280 to perform an operation (or function) for the mobile terminal 200.

The controller 280 typically functions to control overall operation of the mobile terminal 200, in addition to the operations associated with the application programs. The controller 280 may provide or process information or functions appropriate for a user by processing signals, data, information and the like, which are input or output by the various components depicted in FIG. 2, or activating application programs stored in the memory 270. As one example, the controller 280 controls some or all of the components illustrated in FIGS. 2-3 according to the execution of an application program that have been stored in the memory 270.

The power supply unit 290 can be configured to receive external power or provide internal power in order to supply appropriate power required for operating elements and components included in the mobile terminal 200. The power supply unit 290 may include a battery, and the battery may be configured to be embedded in the terminal body, or configured to be detachable from the terminal body.

Referring still to FIG. 2, various components depicted in this figure will now be described in more detail. Regarding the wireless communication unit 210, the broadcast receiving module 211 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 211 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 211 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 212.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 211 may be stored in a suitable device, such as a memory 270.

The mobile communication module 212 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 212 include audio call signals, video (telephony) call signals, or various formats of data to support communication of text and multimedia messages.

The wireless Internet module 213 is configured to facilitate wireless Internet access. This module may be internally or externally coupled to the mobile terminal 200. The wireless Internet module 213 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A, and the like. The wireless Internet module 213 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 213 performs such wireless Internet access. As such, the Internet module 213 may cooperate with, or function as, the mobile communication module 212.

The short-range communication module 214 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 214 in general supports wireless communications between the mobile terminal 200 and a wireless communication system, communications between the mobile terminal 200 and another mobile terminal 200, or communications between the mobile terminal and a network where another mobile terminal 200 (or an external server) is located, via wireless area networks. One example of the wireless area networks is a wireless personal area networks.

In some embodiments, another mobile terminal (which may be configured similarly to mobile terminal 200) may be a wearable device, for example, a smart watch, a smart glass or a head mounted display (HMD), which is able to exchange data with the mobile terminal 200 (or otherwise cooperate with the mobile terminal 200). The short-range communication module 214 may sense or recognize the wearable device, and permit communication between the wearable device and the mobile terminal 200. In addition, when the sensed wearable device is a device which is authenticated to communicate with the mobile terminal 200, the controller 280, for example, may cause transmission of data processed in the mobile terminal 200 to the wearable device via the short-range communication module 214. Hence, a user of the wearable device may use the data processed in the mobile terminal 200 on the wearable device. For example, when a call is received in the mobile terminal 200, the user may answer the call using the wearable device. Also, when a message is received in the mobile terminal 200, the user can check the received message using the wearable device.

The location information module 215 is generally configured to detect, calculate, derive or otherwise identify a position of the mobile terminal. As an example, the location information module 215 includes a Global Position System (GPS) module, a Wi-Fi module, or both. If desired, the location information module 215 may alternatively or additionally function with any of the other modules of the wireless communication unit 210 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 220 may be configured to permit various types of input to the mobile terminal 220. Examples of such input include audio, image, video, data, and user input. Image and video input is often obtained using one or more cameras 221. Such cameras 221 may process image frames of still pictures or video obtained by image sensors in a video or image capture mode. The processed image frames can be displayed on the display unit 251 or stored in memory 270. In some cases, the cameras 221 may be arranged in a matrix configuration to permit a plurality of images having various angles or focal points to be input to the mobile terminal 200. As another example, the cameras 221 may be located in a stereoscopic arrangement to acquire left and right images for implementing a stereoscopic image.

The microphone 222 is generally implemented to permit audio input to the mobile terminal 200. The audio input can be processed in various manners according to a function being executed in the mobile terminal 200. If desired, the microphone 222 may include assorted noise removing algorithms to remove unwanted noise generated in the course of receiving the external audio.

The user input unit 223 is a component that permits input by a user. Such user input may enable the controller 280 to control operation of the mobile terminal 200. The user input unit 223 may include one or more of a mechanical input element (for example, a key, a button located on a front and/or rear surface or a side surface of the mobile terminal 200, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 240 is generally configured to sense one or more of internal information of the mobile terminal, surrounding environment information of the mobile terminal, user information, or the like. The controller 280 generally cooperates with the sending unit 240 to control operation of the mobile terminal 200 or execute data processing, a function or an operation associated with an application program installed in the mobile terminal based on the sensing provided by the sensing unit 240. The sensing unit 240 may be implemented using any of a variety of sensors, some of which will now be described in more detail.

The proximity sensor 241 may include a sensor to sense presence or absence of an object approaching a surface, or an object located near a surface, by using an electromagnetic field, infrared rays, or the like without a mechanical contact. The proximity sensor 241 may be arranged at an inner region of the mobile terminal covered by the touch screen, or near the touch screen.

The proximity sensor 241, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 241 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 241 may sense proximity touch, and proximity touch patterns (for example, distance, direction, speed, time, position, moving status, and the like).

In general, controller 280 processes data corresponding to proximity touches and proximity touch patterns sensed by the proximity sensor 241, and cause output of visual information on the touch screen. In addition, the controller 280 can control the mobile terminal 200 to execute different operations or process different data according to whether a touch with respect to a point on the touch screen is either a proximity touch or a contact touch.

A touch sensor can sense a touch applied to the touch screen, such as display unit 251, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 251, or convert capacitance occurring at a specific part of the display unit 251, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 280. Accordingly, the controller 280 may sense which region of the display unit 251 has been touched. Here, the touch controller may be a component separate from the controller 280, the controller 280, and combinations thereof.

In some embodiments, the controller 280 may execute the same or different controls according to a type of touch object that touches the touch screen or a touch key provided in addition to the touch screen. Whether to execute the same or different control according to the object which provides a touch input may be decided based on a current operating state of the mobile terminal 200 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 280, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 221 typically includes at least one a camera sensor (CCD, CMOS etc.), a photo sensor (or image sensors), and a laser sensor.

Implementing the camera 221 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 251 is generally configured to output information processed in the mobile terminal 200. For example, the display unit 251 may display execution screen information of an application program executing at the mobile terminal 200 or user interface (UI) and graphic user interface (GUI) information in response to the execution screen information.

In some embodiments, the display unit 251 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 252 is generally configured to output audio data. Such audio data may be obtained from any of a number of different sources, such that the audio data may be received from the wireless communication unit 210 or may have been stored in the memory 270. The audio data may be output during modes such as a signal reception mode, a call mode, a record mode, a voice recognition mode, a broadcast reception mode, and the like. The audio output module 252 can provide audible output related to a particular function (e.g., a call signal reception sound, a message reception sound, etc.) performed by the mobile terminal 200. The audio output module 252 may also be implemented as a receiver, a speaker, a buzzer, or the like.

A haptic module 253 can be configured to generate various tactile effects that a user feels, perceive, or otherwise experience. A typical example of a tactile effect generated by the haptic module 253 is vibration. The strength, pattern and the like of the vibration generated by the haptic module 253 can be controlled by user selection or setting by the controller. For example, the haptic module 253 may output different vibrations in a combining manner or a sequential manner.

Besides vibration, the haptic module 253 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 253 can also be implemented to allow the user to feel a tactile effect through a muscle sensation such as the user's fingers or arm, as well as transferring the tactile effect through direct contact. Two or more haptic modules 253 may be provided according to the particular configuration of the mobile terminal 200.

An optical output module 254 can output a signal for indicating an event generation using light of a light source. Examples of events generated in the mobile terminal 200 may include message reception, call signal reception, a missed call, an alarm, a schedule notice, an email reception, information reception through an application, and the like.

A signal output by the optical output module 254 may be implemented in such a manner that the mobile terminal emits monochromatic light or light with a plurality of colors. The signal output may be terminated as the mobile terminal senses that a user has checked the generated event, for example.

The interface unit 260 serves as an interface for external devices to be connected with the mobile terminal 200. For example, the interface unit 260 can receive data transmitted from an external device, receive power to transfer to elements and components within the mobile terminal 200, or transmit internal data of the mobile terminal 200 to such external device. The interface unit 260 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 200 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 200 via the interface unit 260.

When the mobile terminal 200 is connected with an external cradle, the interface unit 260 can serve as a passage to allow power from the cradle to be supplied to the mobile terminal 200 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 270 can store programs to support operations of the controller 280 and store input/output data (for example, phonebook, messages, still images, videos, etc.). The memory 270 may store data related to various patterns of vibrations and audio which are output in response to touch inputs on the touch screen.

The memory 270 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 200 may also be operated in relation to a network storage device that performs the storage function of the memory 270 over a network, such as the Internet.

The controller 280 may typically control the general operations of the mobile terminal 200. For example, the controller 280 may set or release a lock state for restricting a user from inputting a control command with respect to applications when a status of the mobile terminal meets a preset condition.

The controller 280 can also perform the controlling and processing associated with voice calls, data communications, video calls, and the like, or perform pattern recognition processing to recognize a handwriting input or a picture drawing input performed on the touch screen as characters or images, respectively. In addition, the controller 280 can control one or a combination of those components in order to implement various exemplary embodiments disclosed herein.

The power supply unit 290 receives external power or provide internal power and supply the appropriate power required for operating respective elements and components included in the mobile terminal 200. The power supply unit 290 may include a battery, which is typically rechargeable or be detachably coupled to the terminal body for charging.

The power supply unit 290 may include a connection port. The connection port may be configured as one example of the interface unit 260 to which an external charger for supplying power to recharge the battery is electrically connected.

As another example, the power supply unit 290 may be configured to recharge the battery in a wireless manner without use of the connection port. In this example, the power supply unit 290 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 3A and 3B, the mobile terminal 200 is described with reference to a bar-type terminal body. However, the mobile terminal 200 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 200 will generally include a case (for example, frame, housing, cover, and the like) forming the appearance of the terminal. In this embodiment, the case is formed using a front case 201 and a rear case 202. Various electronic components are incorporated into a space formed between the front case 201 and the rear case 202. At least one middle case may be additionally positioned between the front case 201 and the rear case 202.

The display unit 251 is shown located on the front side of the terminal body to output information. As illustrated, a window 251*a* of the display unit 251 may be mounted to the front case 201 to form the front surface of the terminal body together with the front case 201.

In some embodiments, electronic components may also be mounted to the rear case 202. Examples of such electronic components include a detachable battery 291, an identification module, a memory card, and the like. Rear cover 203 is shown covering the electronic components, and this cover may be detachably coupled to the rear case 202. Therefore, when the rear cover 203 is detached from the rear case 202, the electronic components mounted to the rear case 202 are externally exposed.

As illustrated, when the rear cover 203 is coupled to the rear case 202, a side surface of the rear case 202 is partially exposed. In some cases, upon the coupling, the rear case 202 may also be completely shielded by the rear cover 203. In some embodiments, the rear cover 203 may include an opening for externally exposing a camera 221b or an audio output module 252b.

The cases 201, 202, 203 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 200 may be configured such that one case forms the inner space. In this example, a mobile terminal 200 having a uni-body is formed in such a manner that synthetic resin or metal extends from a side surface to a rear surface.

If desired, the mobile terminal 200 may include a waterproofing unit (not shown) for preventing introduction of water into the terminal body. For example, the waterproofing unit may include a waterproofing member which is located between the window 251a and the front case 201, between the front case 201 and the rear case 202, or between the rear case 202 and the rear cover 203, to hermetically seal an inner space when those cases are coupled.

FIGS. 3A and 3B depict certain components as arranged on the mobile terminal. However, it is to be understood that alternative arrangements are possible and within the teachings of the instant disclosure. Some components may be omitted or rearranged. For example, the first manipulation unit 223a may be located on another surface of the terminal body, and the second audio output module 252b may be located on the side surface of the terminal body.

The display unit 251 outputs information processed in the mobile terminal 200. The display unit 251 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 251 may be implemented using two display devices, which can implement the same or different display technology. For instance, a plurality of the display units 251 may be arranged on one side, either spaced apart from each other, or these devices may be integrated, or these devices may be arranged on different surfaces.

The display unit 251 may also include a touch sensor which senses a touch input received at the display unit. When a touch is input to the display unit 251, the touch sensor may be configured to sense this touch and the controller 280, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 251a and a display on a rear surface of the window 251a, or a metal wire which is patterned directly on the rear surface of the window 251a. Alternatively, the touch sensor may be integrally formed with the display. For example, the touch sensor may be disposed on a substrate of the display or within the display.

The display unit 251 may also form a touch screen together with the touch sensor. Here, the touch screen may serve as the user input unit 223 (see FIG. 2). Therefore, the touch screen may replace at least some of the functions of the first manipulation unit 223a.

The first audio output module 252a may be implemented in the form of a speaker to output voice audio, alarm sounds, multimedia audio reproduction, and the like.

The window 251a of the display unit 251 will typically include an aperture to permit audio generated by the first audio output module 252a to pass. One alternative is to allow audio to be released along an assembly gap between the structural bodies (for example, a gap between the window 251a and the front case 201). In this case, a hole independently formed to output audio sounds may not be seen or is otherwise hidden in terms of appearance, thereby further simplifying the appearance and manufacturing of the mobile terminal 200.

The optical output module 254 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 254 to stop the light output.

The first camera 221a can process image frames such as still or moving images obtained by the image sensor in a capture mode or a video call mode. The processed image frames can then be displayed on the display unit 251 or stored in the memory 270.

The first and second manipulation units 223a and 223b are examples of the user input unit 223, which may be manipulated by a user to provide input to the mobile terminal 200. The first and second manipulation units 223a and 223b may also be commonly referred to as a manipulating portion, and may employ any tactile method that allows the user to perform manipulation such as touch, push, scroll, or the like. The first and second manipulation units 223a and 223b may also employ any non-tactile method that allows the user to perform manipulation such as proximity touch, hovering, or the like.

FIG. 3A illustrates the first manipulation unit 223a as a touch key, but possible alternatives include a mechanical key, a push key, a touch key, and combinations thereof.

Input received at the first and second manipulation units 223a and 223b may be used in various ways. For example, the first manipulation unit 223a may be used by the user to provide an input to a menu, home key, cancel, search, or the like, and the second manipulation unit 223b may be used by the user to provide an input to control a volume level being output from the first or second audio output modules 252a or 252b, to switch to a touch recognition mode of the display unit 251, or the like.

As another example of the user input unit 223, a rear input unit (not shown) may be located on the rear surface of the terminal body. The rear input unit can be manipulated by a user to provide input to the mobile terminal 200. The input may be used in a variety of different ways. For example, the rear input unit may be used by the user to provide an input for power on/off, start, end, scroll, control volume level being output from the first or second audio output modules 252a or 252b, switch to a touch recognition mode of the display unit 251, and the like. The rear input unit may be configured to permit touch input, a push input, or combinations thereof.

The rear input unit may be located to overlap the display unit 251 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 223a in the rear input unit. As such, in situations where the first manipulation unit 223a is omitted from the front side, the display unit 251 can have a larger screen.

As a further alternative, the mobile terminal 200 may include a finger scan sensor which scans a user's fingerprint. The controller 280 can then use fingerprint information sensed by the finger scan sensor as part of an authentication procedure. The finger scan sensor may also be installed in the display unit 251 or implemented in the user input unit 223.

The microphone 222 is shown located at an end of the mobile terminal 200, but other locations are possible. If desired, multiple microphones may be implemented, with such an arrangement permitting the receiving of stereo sounds.

The interface unit 260 may serve as a path allowing the mobile terminal 200 to interface with external devices. For example, the interface unit 260 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 200. The interface unit 260 may be implemented in the form of a socket for accommodating an external card, such as Subscriber Identification Module (SIM), User Identity Module (UIM), or a memory card for information storage.

The second camera 221b is shown located at the rear side of the terminal body and includes an image capturing direction that is substantially opposite to the image capturing direction of the first camera unit 221a. If desired, second camera 221a may alternatively be located at other locations, or made to be moveable, in order to have a different image capturing direction from that which is shown.

The second camera 221b can include a plurality of lenses arranged along at least one line. The plurality of lenses may also be arranged in a matrix configuration. The cameras may be referred to as an "array camera." When the second camera 221b is implemented as an array camera, images may be captured in various manners using the plurality of lenses and images with better qualities.

As shown in FIG. 3B, a flash 224 is shown adjacent to the second camera 221b. When an image of a subject is captured with the camera 221b, the flash 224 may illuminate the subject.

As shown in FIG. 3A, the second audio output module 252b can be located on the terminal body. The second audio output module 252b may implement stereophonic sound functions in conjunction with the first audio output module 252a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 211 may be retractable into the terminal body. Alternatively, an antenna may be formed using a film attached to an inner surface of the rear cover 203, or a case that includes a conductive material.

A power supply unit 290 for supplying power to the mobile terminal 200 may include a battery 291, which is mounted in the terminal body or detachably coupled to an outside of the terminal body. The battery 291 may receive power via a power source cable connected to the interface unit 260. Also, the battery 291 can be recharged in a wireless manner using a wireless charger. Wireless charging may be implemented by magnetic induction or electromagnetic resonance.

The rear cover 203 is shown coupled to the rear case 202 for shielding the battery 291, to prevent separation of the battery 291, and to protect the battery 291 from an external impact or from foreign material. When the battery 291 is detachable from the terminal body, the rear case 203 may be detachably coupled to the rear case 202.

An accessory for protecting an appearance or assisting or extending the functions of the mobile terminal 200 can also be provided on the mobile terminal 200. As one example of an accessory, a cover or pouch for covering or accommodating at least one surface of the mobile terminal 200 may be provided. The cover or pouch may cooperate with the display unit 251 to extend the function of the mobile terminal 200. Another example of the accessory is a touch pen for assisting or extending a touch input to a touch screen.

Figure 4:
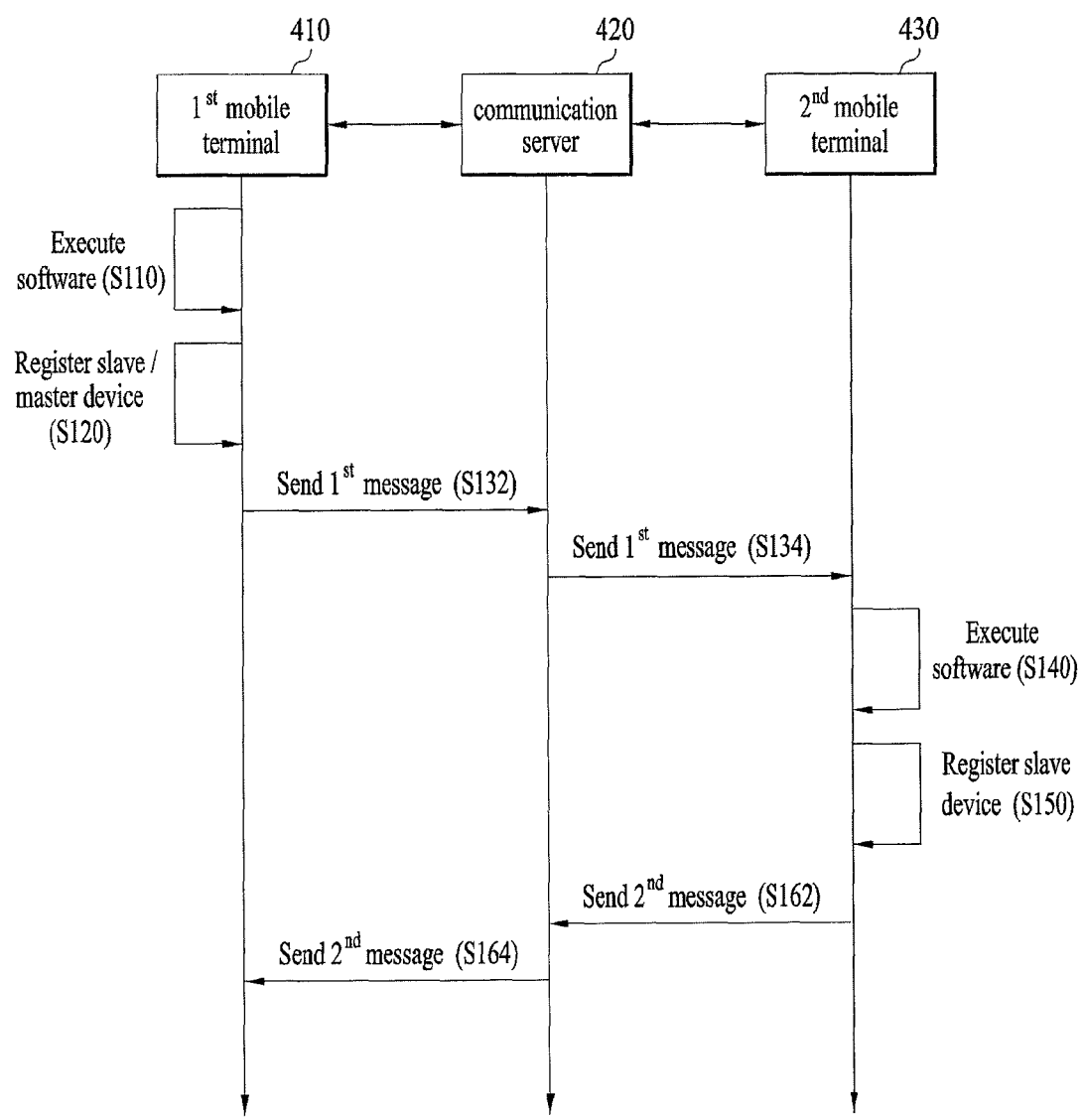
FIG. 4 is a flowchart illustrating a method for registration between mobile terminals according to one embodiment of the present invention.

Next, FIG. 4 is a flowchart illustrating a procedure for registration between mobile terminals according to one embodiment of the present invention. In addition, FIG. 5 is a flowchart illustrating a method of processing an application between mobile terminals according to one embodiment of the present invention. In FIG. 4 and FIG. 5, a first mobile terminal 410 may include a slave mobile terminal and a second mobile terminal 430 may include a master mobile terminal.

A process for registering a first mobile terminal 410 and a second mobile terminal 430 as master-slave mobile terminals is described in detail with reference to FIG. 4 as follows. Referring to FIG. 4, the first mobile terminal 410 activates software (S110). In this instance, the software generally indicates all programs for master-slave registration. For instance, the software may include a firmware such as an operating system (OS) for the mobile terminal 410, an application separately prepared for master-slave mobile terminal registration and the like. In the present specification, the software is taken as an example for the master-slave mobile terminal registration, by which the present invention is not limited. For instance, the master-slave mobile terminal registration is possible through a separate detachable hardware configuration.

If the software is activated in the step S110, the first mobile terminal 410 registers a master mobile terminal and a slave mobile terminal (S120). In this instance, the slave mobile terminal may include the first mobile terminal 410 or a third mobile terminal. If so, the first mobile terminal 410 can play a role as a relay or controller. Further, the master mobile terminal may include the second mobile terminal 430.

In addition, the above-described master-slave mobile terminal registration can be performed in various ways. For instance, the registration procedure can be performed by providing a window for a master mobile terminal registration and a window for a slave mobile terminal registration to a screen of the first mobile terminal 410 and then inputting information of the corresponding mobile terminal to the corresponding window. Thus, the first mobile terminal 410 can be registered by applying a simple touch using the second mobile terminal 430, NFC and the like. If a user of the first mobile terminal 410 touches the window for the master mobile terminal registration, a list of terminals connectible through a wire/wireless communication network is provided.

If a prescribed terminal is selected from the list in response to a selection made by the user, the selected terminal can be registered as the master mobile terminal. In this instance, the wire/wireless communication network can include at least one of the aforementioned communication protocols or networks including Wi-Fi, Bluetooth, 3G, LTE, LTE-A and the like. Further, the user of the first mobile terminal 410 can input registration information on the master mobile terminal in direct for the master mobile terminal registration. In this instance, the registration information may include at least one of a terminal type, a terminal ID (e.g., a serial number, etc.), a terminal network address, terminal payment card information, terminal owner information and the like of the master mobile terminal, i.e., the second mobile terminal 430.

Further, even though the first mobile terminal 410 performs the above-described registration procedure, the registration procedure is not completed with the step S120. In particular, if the registration is completed at the first mobile terminal 410 through the step S120, the first mobile terminal 410 should perform a mutual registration or confirmation procedure from the master mobile terminal based on the registration information in the step S120. Thus, the first mobile terminal 410 creates a first message and then sends the created first message (S132). In this instance, the first message contains address information on the master mobile terminal to enable a confirmation by the master mobile terminal. The address information may include at least one of mobile terminal ID information, a mobile terminal phone number, mobile terminal IP/UDP/MAC address information and the like for example.

The communication server 420 receives the first message from the first mobile terminal 410 and then forwards it to the master mobile terminal, i.e., the second mobile terminal 430 (S134). The communication 420 can determine the second mobile terminal 430, to which the first message will be forwarded, by extracting the address information of the second mobile terminal 430 by parsing the received first message.

If the first message is received through the communication server 420, the second mobile terminal 430 activates the software for the master-slave mobile terminal registration based on the information obtained from parsing the received first message (S140). In this instance, the software activated in the second mobile terminal 430 may be identical to or difference from the software activated in the first mobile terminal 410. Thus, it may be enough for the second mobile terminal 410 to perform the following operation only. In particular, the second mobile terminal 430 determines whether to be registered as an eligible for the master mobile terminal or whether to be registered as the master mobile terminal and then sends a confirmation message to the first mobile terminal 410.

The second mobile terminal 430 registers itself as the master mobile terminal through the activated software and also registers a slave mobile terminal (S150). Thus, the step S150 may be performed by a step identical or similar to the aforementioned step S120. When intending to finally confirm to register the second mobile terminal 430 and the first mobile terminal 410 as the master-slave mobile terminals by registering the first mobile terminal 410 as the slave mobile terminal, the second mobile terminal 430 creates a second message and then sends the created second message (S162). In this instance, the second message may include the address information of the first mobile terminal 410 registered as the slave mobile terminal at least.

Subsequently, the communication server 420 receives the second message from the second mobile terminal 430 and then forwards it to the first mobile terminal 410 (S164). If receiving the second message from the communication server 420, the first mobile terminal 410 terminates the master-slave mobile terminal registration procedure by finally confirming a master-slave mobile terminal registration agreement or denial of the second mobile terminal 430 by parsing the second message.

If the registrations of the first mobile terminal 410 and the second mobile terminal 430 are completed through the above-described procedure, an icon may be displayed on a main screen of each terminal to indicate that the corresponding terminal is the slave mobile terminal or the master mobile terminal. If the icon is accessed by a click or the like, a message sending function button for sending a message such as a text message, an email and the like or a call function button for a voice call, a video call and the like is provided to the corresponding mobile terminal so as to communicate with the corresponding master or slave mobile terminal.

As mentioned in the foregoing description, if the first mobile terminal 410 and the second mobile terminal 430 are completely registered as the master-slave mobile terminals, an application can be processed by a process shown in FIG. 5. A method of processing an application between a master mobile terminal and a slave mobile terminal is described in detail with reference to FIG. 5 as follows.

Referring to FIG. 5, if a user selects a prescribed application from the first mobile terminal 410 (S210), the first mobile terminal 410 creates a first message required for processing the selected application with the second mobile terminal 430, i.e., the master mobile terminal (S220). If the created first message is sent by the first mobile terminal 410 (S232), the communication server 420 receives the first message and then forwards it to the second mobile terminal 430 (S234). The second mobile terminal 430 then parses to check the forwarded first message (S240). In this instance, checking the first message may mean that various kinds of information (e.g., attributes of an application included in the first message, a title of the application, an application use time, an application use agreement message, etc.) contained in the first message are checked.

The second mobile terminal 430 creates a second message including data such as an agreement, denial, conditional agreement, conditional denial and the like for the checked first message (S250). If the second mobile terminal 430 sends the second message (S262), the communication server 420 forwards the second message to the first mobile terminal 410 (S264). The first mobile terminal 410 parses the received second message and then processes the application based on the parsed second message data (S270). In this instance, processing the application may mean an application download, an application update/upgrade, an application activation, an application deactivation or the like. So far, the application processing method is schematically described with reference to FIG. 5. In addition, UI/UX provisions and related processing protocols for the respective steps shall be described in detail with reference to the accompanying drawings later.

FIG. 6 is a flowchart illustrating a method of processing an application between mobile terminals according to another embodiment of the present invention. FIG. 7 is a flowchart illustrating a method of processing an application between mobile terminals according to further embodiment of the present invention. In addition, FIG. 8 is a flowchart illustrating a method of processing an application between mobile terminals according to another further embodiment of the present invention.

The following descriptions of the master-slave mobile terminal registration and application processing methods with reference to FIGS. 6 to 8 differ from the former description with reference to FIGS. 4 and 5 in that a separate server is further provided between a mobile terminal and a communication server. Hence, in the following descriptions with reference to FIGS. 6 to 8, the overlapped description shall be omitted.

Referring to FIG. 6, the first mobile terminal 610 activates software and then registers a master-slave mobile terminal (S310 and S320). The first mobile terminal 610 creates and sends a message 1 related to a registration after the step S320 (S332). A first server 620 receives the message 1 from the first mobile terminal 610, creates a message 1-1 by processing the received message 1, and then sends the created message 1-1 (S334). In particular, for example, the message 1-1 is created by information related to the message 1 saved in the first server 620 is included in the message 1 or processed based on the message 1. For instance, the message 1-1 may be configured by combining such information of the first mobile terminal 610 related to the message 1 as a status, an attribute, a history and the like with the message 1. Further, the first server 620 temporarily saves the message 1 only and forwards it to a second server 630 without modifying or processing the message 1.

The second server 630 is a communication server and forwards the received message 1-1 to a second mobile terminal 640 (S336). The second mobile terminal 640 parses the forwarded message 1-1, activates software based on the parsed information (S340), and registers a slave mobile terminal (S350). After the step S350 or the step S336, the second mobile terminal 640 creates and sends a message 2 containing agreement or denial intention data for the message 1-1 (S362).

The second server 630 receives the message 2 and then forwards it to the first server 620 (S364). The first server 620 creates a message 2-1 by processing the forwarded message 2 and then sends it to the first mobile terminal 610 (S366). Thus, the second server 630 can directly forward the message 2 to the first mobile terminal 610. In this instance, the first mobile terminal 610 forwards the directly received message 2 to the first server 620 and may then receive a corresponding feedback. Further, the first server 620 temporarily saves the forwarded message 2 by checking errors and may then forward it without processing the message 2 at all.

If the message 2 (or the message 2-1) is received from the first server 620 or the second server 630, the first mobile terminal 610 terminates the master-slave mobile terminal registration procedure by finally confirming the master-slave mobile terminal registration agreement or denial intention of the second mobile terminal 640 by parsing the message 2 (or the message 2-2). If the registrations of the first mobile terminal 610 and the second mobile terminal 640 are completed through the above-described procedure, an icon may be displayed on a main screen of each terminal to indicate that the corresponding terminal is the slave mobile terminal or the master mobile terminal. If the icon is accessed by a click or the like, a message sending function button for sending a message such as a text message, an email and the like or a call function button for a voice call, a video call and the like is provided to the corresponding mobile terminal so as to communicate with the corresponding master or slave mobile terminal.

Next, FIGS. 7 and 8 are flowcharts illustrating an application processing method between the mobile terminals registered as the master-slave mobile terminals shown in FIG. 6. FIGS. 7 and 8 differ from each other in a data processing between the first mobile terminal 610 and the first server 620. Moreover, since FIGS. 7 and 8 are similar to FIG. 5, the different parts shall be mainly described in detail.

Referring to FIG. 7, if a user selects a prescribed application from the first mobile terminal 610 (S410), the first mobile terminal 610 creates a message 1 required for processing the selected application with the second mobile terminal 640, i.e., the master mobile terminal (S420). If the created message 1 is sent by the first mobile terminal 610 (S432), the first server 620 creates a message 1-1 by processing the received message 1 and then sends the created message 1-1 (S434).

The second server 630 receives the message 1-1 from the first server 620 and then forwards it to the second mobile terminal 640 (S436). The second mobile terminal 640 parses to check the forwarded message 1-1 (S440). In this instance, checking the message 1-1 may mean that various kinds of information (e.g., attributes of an application, a title of the application, an application use time, an application use agreement message, etc.) contained in the message 1 are checked. The second mobile terminal 640 creates a message 2 including data such as an agreement, denial, conditional agreement, conditional denial and the like for the checked message 1 (S450). If the second mobile terminal 640 sends the message 2 (S462), the second server 630 forwards the received message 2 to the first server 620 (S464).

The first server 620 creates a message 2-1 by processing the forwarded message 2 and then sends it to the first mobile terminal 610 (S466). The first mobile terminal 610 parses the received message 2-1 and then processes the application based on data of the parsed message 2-1 (S470). In this instance, processing the application may mean an application download, an application update/upgrade, an application activation, an application deactivation or the like.

Referring to FIG. 8, if a user selects a prescribed application from the first mobile terminal 610 (S510), the first mobile terminal 610 creates a message 1-1 required for processing the selected application with the second mobile terminal 640, i.e., the master mobile terminal. If the message 1-1 is requested by the first mobile terminal 610 (S522), the first server 620 collects the message 1-1 and then returns it to the first mobile terminal 610 again in response to the request (S524).

The first mobile terminal 610 creates a message 1-2 based on the returned message 1-1 (S530) and then sends the created message 1-2 (S542 or S544). Thus, the first mobile terminal 610 can send the message 1-2 to the second server (i.e., a communication server) 630 via the first server 620 (S542) or in direct (S544). The second server 630 forwards the received message 1-2 to the second mobile terminal 640 (S546). The second mobile terminal 640 parses to check the forwarded message 1-2 (S550). In this instance, checking the message 1-2 may mean that various kinds of information (e.g., attributes of an application, a title of the application, an application use time, an application use agreement message, etc.) contained in the message 1-2 are checked.

The second mobile terminal 640 creates a message 2 including data such as an agreement, denial, conditional agreement, conditional denial and the like for the checked message 1-2 (S560). If the second mobile terminal 640 sends the message 2 (S572), the second server 630 forwards the received message 2 to the first mobile terminal 610 via the first server 620 or in direct (S574 or S576). Thus, in the former, case, i.e., if the message 2 is sent via the first server 620, the first server 620 creates a message 2-1 by processing the message 2 and then sends the message 2-1 to the first mobile terminal 610. The first mobile terminal 610 parses the received message 2-1 and then processes the application based on data of the parsed message 2-1 (S580). In this instance, processing the application may mean an application download, an application update/upgrade, an application activation, an application deactivation or the like.

The application processing method is schematically described with reference to FIGS. 7 and 8. In addition, UI/UX provisions and related processing protocols for the respective steps shall be described in detail with reference to the accompanying drawings later. Further, a registration and application processing method between a single master mobile terminal and a plurality of slave mobile terminals, a registration and application processing method between a plurality of master mobile terminals and a single slave mobile terminal, and a registration and application processing method between a plurality of master mobile terminals and a plurality of slave mobile terminals can be implemented by applying the embodiments with reference to FIGS. 4 to 8 thereto in a manner as intact or combined with each other.

Further, to help the understanding of the present invention, in the present specification, a master mobile terminal may mean a mobile terminal of a parent and a slave mobile terminal may mean a mobile terminal of a child of the parent, by which the present invention is not limited. As mentioned in the foregoing description, a master-slave mobile terminal registration between mobile terminals in a mobile communication system and an application processing in a slave mobile terminal are explained. In the following description, the latter case, i.e., data communications with a master mobile terminal for processing an application in the slave mobile terminal shall be further explained in detail First of all, according to an embodiment of the present invention, for instance, in order to download or activate (hereinafter called 'activate') an application, a slave mobile terminal (e.g., a child) sends a request for an authentication or agreement (hereinafter called authentication) to a master mobile terminal (e.g., a parent). In response to the request, the master mobile terminal makes a response such as an agreement, a conditional agreement, a denial and the like. Hence, the slave mobile terminal can process the corresponding application.

In particular, according to an embodiment of the present invention, the application processing method can be configured in various ways through various factors in the above process as well as the authentication request and the agreement procedures. For instance, the factors may include data of a status and emotion (e.g., feeling) of an owner of a master mobile terminal in a salve mobile terminal and the like. The above description is applicable to a case of switching the slave mobile terminal to the master mobile terminal as well.

In order for a master mobile terminal to agree to an application activation authentication request, a salve mobile terminal collects status information on an owner of the master mobile terminal and can then make a request for the agreement based on the collected status information. Thus, there are three kinds of methods for collecting status information on an owner of a master mobile terminal. According to a first method, an owner of a master mobile terminal collects and uses the records for agreements to a use of a prescribed application of a slave mobile terminal. According to a second method, a slave mobile terminal collects and uses the records for the interactions with an owner of a master mobile terminal.

According to a third method, status information of an owner of a master mobile terminal is collected and used through a microphone, a wearable device and the like. Although the above-mentioned methods are described individually in the present specification to help the understanding of the present invention and for clarity of the following description, it can raise the possibility of an agreement of the owner of the master mobile terminal by collecting the status information of the owner of the master mobile terminal by combining at least two of the above-mentioned methods with each other.

Next, FIG. 9 is a diagram illustrating status information collecting method according to one embodiment of the present invention. In addition, FIG. 10 is a diagram illustrating basic data for status information creation shown in FIG. 9. Referring to FIG. 9, a mobile terminal (e.g., a slave mobile terminal) can transmit data for activation of a prescribed application using a previous authentication request and corresponding response for the application of a master mobile terminal, i.e., information on a presence or non-presence of an agreement of the master mobile terminal. Thus, the information on the previous authentication request and the presence or non-presence of the corresponding agreement of the master mobile terminal may be saved in a storage unit of the slave mobile terminal, a manufacturer server or a cloud server for example.

If an application activation request is received from a user, the slave mobile terminal extracts information related to the master-slave authentication request and agreement saved in its storage unit or a storage unit of a sever. In this instance, the extracted information related to the master-slave authentication request and agreement may include at least one of an application attribute and/or type, an application species, an application activation authentication and agreement request, time information and information on an authentication scheme.

In this instance, the time information may include hour information such as a month, a week, a day and an hour and weekday information such as a week day and the like. The application attribute and/or type may mean the above-mentioned master-slave mobile terminal registration procedure or an attribute or type of an application individually controlled by the master based on the information of the slave mobile terminal. For instance, when there is a pay application, rating-restricted application, education application, game application, communication application and the like, a user of a first mobile terminal directly selects a corresponding application and can receive a control of a second mobile terminal that is a master mobile terminal. If a category of an application belongs to one the above-enumerated applications, the application attribute and/or type is automatically set up and can receive a control of the master mobile terminal.

The authentication scheme may include one of an MMS (Multimedia Message Service), a video call, a voice call and the like, which is a scheme for making an authentication request to a second mobile terminal from a first mobile terminal. The first mobile terminal can make an authentication request to the second mobile terminal using at least one of the above-mentioned authentication schemes. Thus, the first mobile terminal can calculate a successful rate of each of the authentication schemes by combining the above-mentioned different data with the information on the previous authentication scheme.

Thus, FIG. 9 shows the authentication schemes by combining the information on the master-slave mobile terminal authentication request and the presence or non-presence of the agreement with the difference data. Referring to FIG. 9, authentication schemes are provided to a screen of the first mobile terminal by pop-up. In particular, the authentication schemes can be provided as icons to be selected individually. For the respective authentication schemes, as mentioned in the foregoing description, it can display a value resulting from calculating a probability in receiving an agreement in response to an authentication request based on data for examination of a different authentication request and a presence or non-presence of an agreement.

For instance, in FIG. 9, an MMS scheme has 89% of a probability in receiving an agreement in response to an authentication request, an email scheme has 81% of a probability in receiving an agreement in response to an authentication request, a video call scheme has 75% of a probability in receiving an agreement in response to an authentication request, and a voice call scheme has 48% of a probability in receiving an agreement in response to an authentication request. Hence, such information is indicated to facilitate selection made by a user of the first mobile terminal.

In this instance, the numerical values of the possibilities are randomly selected to help the understanding of the present invention, by which the present invention is not limited. In addition, the numerical values can be calculated in various ways. Further, based on the numerical values of the calculated probability in receiving an agreement in response to an authentication request, the first mobile terminal can provide the possibilities sorted in order descending from an item of a high numerical value to an item of a low numerical value.

FIG. 10 shows one example of the previous record described with reference to FIG. 9, i.e., history data. Referring to FIG. 10, time data, authentication scheme data and information on a presence or non-presence of agreement in response to an authentication request are illustrated for a specific application. Further, a first mobile terminal configures a table of the data shown in FIG. 10, saves the configured table, and can then use the saved table later.

For instance, the first mobile terminal makes a request for authentication of an application 'magumagu 2013' by MMS at 16:17, Monday, March 11 in 2012 and an application activation is accepted by the second mobile terminal. The first mobile terminal also makes a request for authentication of an application 'magumagu 2013' by MMS at 20:09, Friday, March 24 in 2012 and an application activation is accepted by the second mobile terminal. The first mobile terminal also makes a request for authentication of an application 'magumagu 2013' by MMS at 19:10, Monday, May 1 in 2012 and an application activation is accepted by the second mobile terminal.

The first mobile terminal also makes a request for authentication of an application 'magumagu 2013' by a video call at 19:12, Thursday, September 23 in 2012 and an application activation is accepted by the second mobile terminal. Yet, the first mobile terminal also makes a request for authentication of an application 'magumagu 2013' by a video call at 21:33, Saturday, January 2 in 2013 and an application activation is denied by the second mobile terminal. Based on the history data, the first mobile terminal can obtain a status or tendency of the second mobile terminal in advance. The following analyses are possible for the application 'magumagu 2013' shown in FIG. 10.

For instance, the time information in the history data based information may include data indicating 'A user of the second mobile terminal is generous for an agreement request except weekends.', 'A user of the second mobile terminal is generous for an agreement request on Monday, Thursday and Friday. Yet, a possibility of agreement by the user of the second mobile terminal is 50%.', 'A user of the second mobile terminal is generous for an agreement request before 21:00 or the agreement request is not made after 21:00.', 'If an authentication message is sent by MMS as authentication scheme data, an application agreement can be received from the second mobile terminal', 'When making an authentication request by a video call, an agreement possibility of a user of the second mobile terminal is 50%.', and the like. The same principle is applicable to an application 'Pooq'.

In particular, if an authentication is requested by a voice call at 20:12, Friday, July 8 in 2012, the request is not accepted by the second mobile terminal. However, if an authentication request is made by MMS at 18:22, Friday, October 23 in 2012, the request is accepted by the second mobile terminal. Based on this, the first mobile terminal can propose the MMS scheme for the acceptance rather than the voice call for the application Pooq. If so, it can notify that the probability of the agreement is high.

As mentioned in the forgoing description, based on the above-described history data, the first mobile terminal calculates each possibility of agreement made by the second mobile terminal in response to the authentication request through various combinations of a prescribed application unit, an application category unit, an authentication-agreement time unit, an authentication scheme unit and the like. Based on the calculated possibilities, the first mobile terminal proposes a best method to a user of the first mobile terminal or sorts the methods by the possibilities in order, thereby facilitating user's selection.

Moreover, used time information of each application, information on a linked application, detailed data information of an agreement request message and the like can be further added to the data shown in FIG. 10. According to the description with reference to FIGS. 9 and 10, as mentioned in the foregoing description, the possibility of agreement in response to an authentication request from the first mobile terminal to the second mobile terminal can be raised based on the previous application records.

Next, FIG. 11 is a diagram illustrating a status information collecting method according to another embodiment of the present invention. FIG. 11 shows another example of collection of status information on a user of a second mobile terminal in an authentication-agreement protocol from a first mobile terminal to a second mobile terminal. The example shown in FIG. 11 may be independently provided to a user of the first mobile terminal or may be provided by being combined with the data shown in FIG. 9 or 10.

If the status information shown in FIG. 9 or 10 mainly corresponds to a specific application unit, the status information shown in FIG. 11 is collected through the records normally exchanged between a user of the first mobile terminal and a user of the second mobile terminal, i.e., the interactive records irrespective of the application. Namely, although the user of the first mobile terminal makes an authentication request for an activation of a prescribed application and receives an agreement from the user of the second mobile terminal, a factor according to a presence or non-presence of an agreement on an application activation may include a user's emotion status, i.e., a status information. In this instance, the user's emotional status mentioned in the following description mainly means an emotional status of the user of the second mobile terminal but may reflect an emotional status of the user of the first mobile terminal as well.

Further, FIG. 11 shows one example of various interactive records exchanged between the user of the first mobile terminal and the user of the second mobile terminal to obtain an emotional status of the user of the second mobile terminal. In addition, the interactive records may include items of SMS (Short Message Service)/MMS, email, voice call, video call and the like. Besides, the respective items can be used in obtaining the emotional status of the user of the second mobile terminal individually or by certain combination thereof.

Regarding the SMS/MMS/email interactive record shown in FIG. 11 (a), an emotional status is obtained by crawling all SMS/MMS/email substances exchanged between a user of the first mobile terminal and a user of the second mobile terminal for a prescribed period. In this instance, the prescribed period may include a day unit, a week unit, a month unit or a year unit or may be limitless without period. Yet, a different weight can be given to each of the SMS/MMS/email substances depending on whether it is a recent SMS/MMS/email data or an SMS/MMS/email data older than the recent SMS/MMS/email data. Further, the first mobile terminal parses the substances of the crawled SMS/MMS/email data using a prescribed keyword. In this instance, at least one or more keywords may exist and may follow a user's selection automatically or manually.

Based on the parsed substances, the first mobile terminal can provide data of a recent emotional status of the user of the second mobile terminal. For instance, if the SMS/MMS/email substance corresponds to 'Do your homework after school. Time of reception: 3:30 PM Today', as shown in FIG. 11 (a), the keywords may include 'school' and 'homework'. Further, if a current hour is not later than 4 PM Friday, since it is the time at which the user of the second mobile terminal is currently interested in 'school' and 'homework', i.e., a close hour, it can notify the user of the first mobile terminal that the possibility of denial in response to an authentication request is very high. Referring to FIG. 11 (b), regarding the voice/video call interactive record, it can create status information by synthetically considering a voice call substance recently recorded automatically or manually, a substance recorded in the course of the video call, information on an expression, voice tone and change of a counterpart and the like.

FIG. 12 is a diagram illustrating a status information collecting method according to further embodiment of the present invention. In particular, FIG. 12 shows another example of a status information collecting method using a wearable device. Referring to FIG. 12, wearable devices may include smart glasses 1210 shown in FIG. 12 (a), a smart watch 1220 shown in FIG. 12 (b) and the like. The wearable device is detachably worn on a user. If the wearable device is worn on a user, it is attached to a body of the user, and more particularly, to a face or hand. For the smart glasses 1210, sensing information is obtained through a user's expression, a user's voice tone, a surrounding noise and the like.

For the smart watch 1220, sensing information such as a user's pulse rate, a user's body temperature and the like is obtained. Based on the obtained sensing information, the controller can determine a status of the corresponding user. Further, the status determination can be made with reference to a mode of the wearable device in addition to or aside from the sensing information. For instance, when a user sets the mode of the wearable device to a conference mode or the like, the corresponding status information can be modified.

Hence, the sensing information may not be collected from the beginning with reference to the mode. Alternatively, the sensing information may be modified depending on the mode. Alternatively, a user's status can be determined depending on the mode despite a presence of the sensing information. The user's status information is separately explained in the above descriptions with reference to FIGS. 9 to 12. However, if the above-explained examples are combined in various ways, it can decrease errors of the user's status information and increase the accuracy of the user's status information.

FIG. 13 is a diagram illustrating an application processing method for a plurality of mobile terminals. FIG. 13 shows when there is a plurality of master mobile terminals having agreement authority when a prescribed application is activated and processed in a slave mobile terminal. In the following description, assume that the slave mobile terminal includes a mobile terminal retained by a child and that the master mobile terminals include mobile terminals retained by a mother and father.

Referring to FIG. 13, the slave mobile terminal can make an authentication request to each of a plurality of the master mobile terminals. In this instance, the expected responses made by a plurality of the master mobile terminals in response to the authentication request may include agreements made by all of the master mobile terminals, denials made by all of the master mobile terminals, or one agreement made by one of the master mobile terminals and one denial made by the other. Thus, if the slave mobile terminal receives the responses from the master mobile terminals, it raises an issue of an application processing method.

Basically, when a slave mobile terminal receives a response of agreement or denial from every master mobile terminal, the slave mobile terminal recognizes the response as 'processing an application (e.g., application download, application activation, etc.)' or 'not processing an application' and then makes another authentication request. When the responses made by the master mobile terminals in response to the authentication request from the slave mobile terminal are divided into an agreement and a denial, it may raise an issue of a method for processing the application in the slave mobile terminal.

For instance, if a payment such as a cost approval and the like is required for an application download or the like, the salve mobile terminal can transmit information on the payment and the like to the master mobile terminal having made the agreement only. In this instance, all payment information can be transmitted to all of the master mobile terminals having made the agreements simultaneously or sequentially.

Alternatively, all payment information can be distributedly transmitted to each of the master mobile terminals equivalently or differentially.

In another instance, when an activation of an application is processed, if the number of the master mobile terminals having made the agreements is equal to or greater than the number of the entire master mobile terminals, it can control the application to be activated. Moreover, regarding an activation time or the like when the application activation, it can restrict a portion of a total activation time requested by the slave mobile terminal depending on the number of the master mobile terminals having made the agreements. On the contrary, for example, after a request for activating an application during 30 minutes has been made to each of the master mobile terminals, if an activation agreement request is received from each of the two master mobile terminals, it can control the application to be activated during one hour. Further, this may be applicable only if the activation agreements are received from all of the master mobile terminals.

Further, in FIG. 13, when an authentication request is made to a plurality of the master mobile terminals, the slave mobile terminal can send an authentication request message of the same format to the corresponding master mobile terminals. Alternatively, the slave mobile terminal individually creates an authentication request message of a format having a high agreement probability and then sends the created authentication request message to each of the master mobile terminals. In particular, in the former case, the slave mobile terminal recollects status information on a status of a user of the corresponding master mobile terminal by the description with reference to FIGS. 9 to 12 and can then make an authentication request to the master mobile terminal denying the agreement again.

Next, FIGS. 14 to 17 are diagrams illustrating an application UI/UX provided depending on status information in a mobile terminal. With reference to FIGS. 14 to 17, methods of processing an application depending on status information of a user of a master mobile terminal in a slave mobile terminal by the descriptions with reference to FIGS. 8 to 13 are described as follows. Particularly, FIGS. 14 to 17 relate to user interfaces provided to a screen of a slave mobile terminal for at least one specific preset application controlled by a master mobile terminal in accordance with master-slave mobile terminal registration.

As mentioned in the foregoing description, for prescribed applications, a slave mobile terminal controls a prescribed data to overlay an application icon output to a screen or controls a color of the application icon to be changed, depending on a status of a user of a master mobile terminal. Therefore, the status of the user of the master mobile terminal is intuitively cognitive in the slave mobile terminal and the salve mobile terminal provides previous information in response to a later authentication request or the like, whereby the user's convenience can be enhanced.

Figure 14:
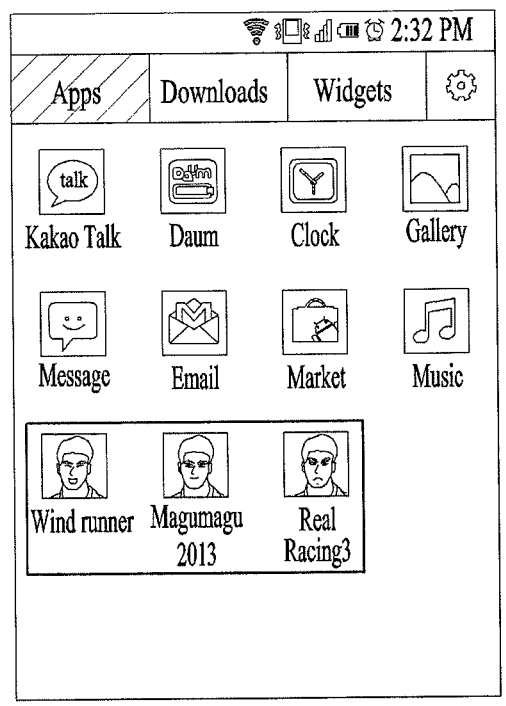
FIGS. 14 to 17 are diagrams illustrating an application UI/UX provided depending on status information in a mobile terminal.

Further, in FIGS. 14 to 17, the processing of the application icon and the like in the salve mobile terminal can be performed by updating a state of the corresponding application icon manually in response to a request made by a user of the slave mobile terminal or by automatically collecting a status information in the slave mobile terminal periodically without the request. In particular, FIG. 14 shows when an image of a user of a master mobile terminal overlays a corresponding application icon. Thus, the image of the user of the master mobile terminal can be created from a slave mobile terminal based on collected status information of the user of the corresponding master mobile terminal.

Further, a plurality of images may exist depending on how the status information is sorted by the slave mobile terminal. In FIG. 14, as statuses of the user of the master mobile terminal are sorted into 'good', 'normal' and 'bad', it can use an image depending on the corresponding status. Thus, the image can be obtained from photos, videos and other image data previously saved in a mobile terminal that is the slave mobile terminal. Alternatively, the image can be received from the master mobile terminal in response to a request made to the master mobile terminal. Alternatively, the image can be used by being downloaded from a server or the like.

Referring to FIG. 14 (b), image data based on status information of a user of a master mobile terminal overlay applications 'wind runner', 'magumagu 2013' and 'real racing 3'. Thus, the corresponding applications may be overlaid with the same image data. Alternatively, the applications may be overlaid with different image data, respectively. In the latter case, the salve mobile terminal preferably collects status information by an application unit. Further, data of images, videos and the like of the user of the master mobile terminal, which overlay the applications, can be provided in a different size per application. For instance, if a status information of the user of the master mobile terminal for a prescribed application is affirmative, a size of the data overlaying the corresponding application is provided in a size larger than that of an original image, and vice versa. In another instance, if a status information of the user of the master mobile terminal for a prescribed application is negative, a size of the data overlaying the corresponding application is provided in a size smaller than that of an original image, and vice versa.

Although FIG. 14 shows one example of when a single master mobile terminal exists, the above-described method is applicable to when a plurality of master mobile terminals exist. For instance, when a plurality of master mobile terminals exist, the status information sorting shown in FIG. 14 (b) is subdivided. In addition, the corresponding images are then processed by being obtained and defined. In particular, statuses of the master mobile terminal can be defined by being sorted into 4 steps 'good', 'normal-1', 'normal-2' and 'bad' instead of the 3 steps 'good', 'normal' and 'bad' shown in FIG. 14 (b).

In this instance, the normal-1 corresponds to when a status of a user of the master mobile terminal is sorted into 'good' or 'bad'. In addition, the normal-2 corresponds to when a status of the user of the master mobile terminal is sorted into 'normal' all. When the normal-1, it is enough to perform the processing shown in FIG. 13. When the normal-2, the processing is performed in the same manner of the normal in the aforementioned 3 steps. Further, it can define a further subdivided status control relation depending on the number of master mobile terminals, a selection made by a user of the slave mobile terminal, or the like.

Figure 15:
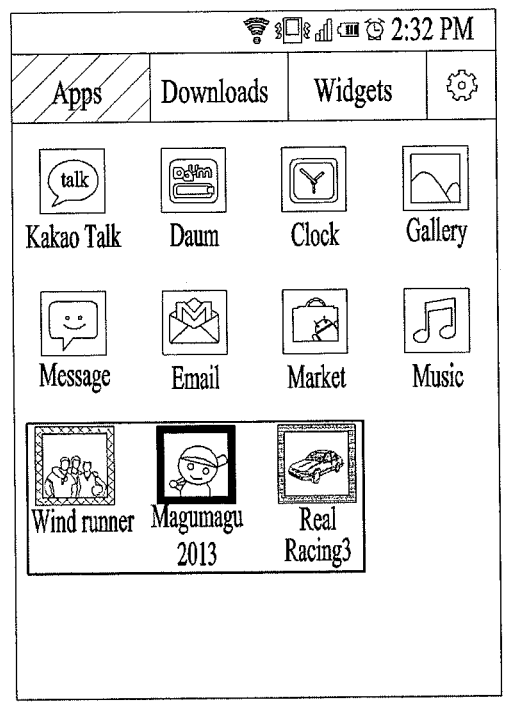

Referring to FIG. 15, by changing an outline color of a corresponding application icon instead of overlaying image data, video data and the like shown in FIG. 14, a user of a slave mobile terminal can intuitively recognize a status of a user of a master mobile terminal. For instance, in FIG. 15, a status of a master mobile terminal user is sorted into one of 5 steps including 'very good', 'good', 'normal', 'bad' and 'very bad'. In addition, an outline color of a corresponding application icon can be defined to be mapped to green, blue, yellow, orange or red depending on each of the steps. In addition, such a relation between the status and the color is changeable by settings.

Figure 16:
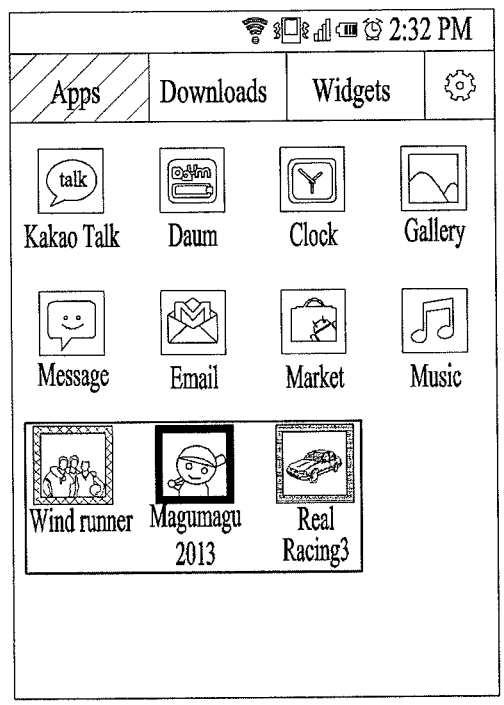
Figure 17:
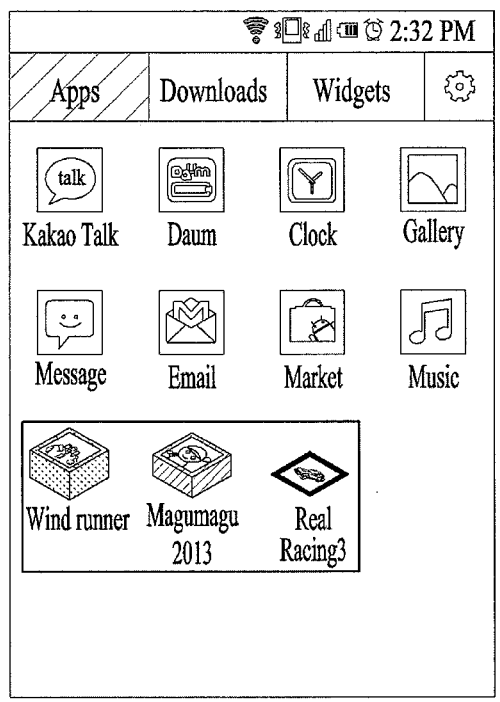

Referring to FIG. 16, a color is processed in a manner similar to that of FIG. 15. Yet, an outline of a corresponding application icon is implemented to flicker, whereby user's convenience can be further enhanced than that in FIG. 15. Referring to FIG. 17, a slave mobile terminal can implement a corresponding application icon 3-dimensionally based on status information of a user of a master mobile terminal.

If the slave mobile terminal defines a thickness of an icon outline 3-dimensionally in each status depending on a status information of a user of the master mobile terminal (FIG. 17 (*a*)), an application icon can be actually provided to a screen of the slave mobile terminal (FIG. 17 (*b*)). Further, each application icon shown in FIG. 17 (*a*) or FIG. 17 (*b*) can be implemented by combining the schemes shown in FIGS. 14 to 16 with each other. In particular, image or video data overlays an application item or an outline of the application icon can be colored.

Further, the image or video data is not configured to overlay a corresponding application icon from the beginning in FIG. 14. Thus, if a user selects a corresponding application, the image or video data can be configured by popping up (not shown in the drawing). In this instance, audio data is mapped in accordance with a status of the master mobile terminal user together with or separately from the image or video data. Hence, the audio data can be played if the corresponding application is selected.

In FIGS. 14 to 17, the slave mobile terminal can handle at least one or more applications controlled by the master mobile terminal separately from other applications. For instance, the corresponding at least one or more applications can be provided by being configured as a separate folder. In another instance, the corresponding at least one or more applications are sorted by status information of the user of the master mobile terminal for application and can be then provided through folders, respectively. In particular, for example, application icons correspondingly processed in accordance with a status 'good' of the master mobile terminal user are provided only to a first folder, application icons correspondingly processed in accordance with a status 'normal' of the master mobile terminal user are provided only to a second folder, and application icons correspondingly processed in accordance with a status 'bad' of the master mobile terminal user are provided only to a third folder.

FIG. 18 is a diagram illustrating a method of sending a message depending on status information according to one embodiment of the present invention. FIG. 18 shows a scenario for making an authentication request depending on status information after applying the status information to an application in a slave mobile terminal by the principle shown in one of FIGS. 14 to 17.

Referring to FIG. 18 (*a*), status information is provided to an application icon 3-dimensionally like FIG. 17 (*b*). Thus, if a user selects a prescribed application icon, referring to FIG. 18 (*b*), a slave mobile terminal provides a user interface for an authentication scheme having a high agreement probability when making an authentication request to a user of a master mobile terminal based on the status information on the corresponding icon and the detailed status information shown in FIGS. 8 to 13. If a prescribed scheme is selected in FIG. 18 (*b*), the slave mobile terminal can make an authentication request to the master mobile terminal by configuring a message in form of QR code or bar code and then sending the message to the master mobile terminal as shown in FIG. 18 (*c*).

Figure 19:
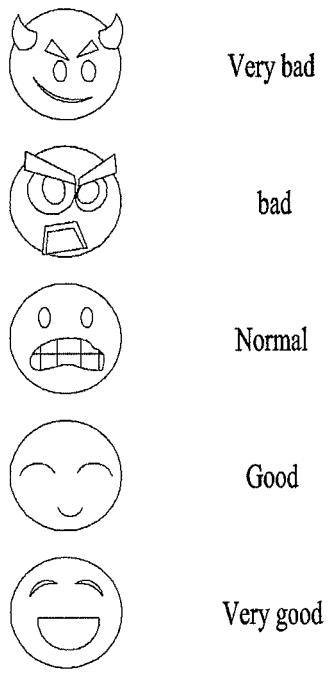

Next, FIGS. 19 and 20 are diagrams illustrating an application UI/UX provided depending on status information in a mobile terminal. Like FIG. 18, when a user of a slave mobile terminal makes an authentication request, it can transmit status information of the user. For instance, the user of the slave mobile terminal can send an authentication request message together with a status information icon shown in FIG. 19 (*a*).

If the slave mobile terminal sends the authentication request message including the status information icon, a master mobile terminal can refer to the status information of the slave mobile terminal user by parsing the authentication request message in making a response to the authentication request message. Thus, mutual status information is sent together with a prescribed message between a master mobile terminal and a slave mobile terminal, thereby preventing authentication-agreement relation errors or harmful consequences due to the message transmission. That is, if an authentication request from a slave mobile terminal is not relevant or a master mobile terminal intends to deny the authentication request, it can handle the authentication request appropriately based on a status of a user of the slave mobile terminal.

FIG. 19 (*b*) shows one example that authentication request messages from slave mobile terminals are displayed together with status information, which are sent together with the authentication request messages, of users of the salve mobile terminals, respectively. According to the above description, a status of a user of a slave mobile terminal is displayed when making an authentication request. However, after the authentication request, it can continue to receive and update status information periodically. Thus, if a corresponding list is selected, a master mobile terminal can check the development of a status change of the user of the slave mobile terminal until the selection from a timing point of sending the authentication request message from the slave mobile terminal.

Referring to FIG. 20 (*a*), a list configured like FIG. 19 (*b*) is provided. Looking into an item related to a daughter in the list, a master mobile terminal can intuitively recognize that an emotional status of the daughter is not good through a status information icon. Thus, if the corresponding item is selected, the master mobile terminal can provide a user interface shown in FIG. 20 (*b*) in response to an authentication request message of the corresponding item.

Referring to FIG. 20 (*b*), for instance, when the selected message in FIG. 20 (*a*) corresponds to a request for an application activation time, it can change an agreement message for the activation time or a previously agreed substance using the user interface provided by the master mobile terminal. The user interface shown in FIG. 20 (*b*) can provide an item for selecting a time, an item for selecting a forcible end, an item for composing a message, an item for selecting a transmission and an item for selecting a cancellation. As mentioned in the foregoing description, the above-described configuration of the user interface shown in FIG. 20 (*b*) can be configured differently depending on a selected authentication request message.

Further, the user interface shown in FIG. 20 (*b*) can be provided by configuring an additional user interface for a data input to each item in response to a selection made by a user of a master mobile terminal. For instance, if a master mobile terminal user selects a message item, a user interface for sending a text, an image and the like can be additionally provided as a popup or the like. A status information icon disclosed in the present specification is provided as one of means for smoothly resolving an emotional response possibly occurring between a master mobile terminal and a slave mobile terminal when making an authentication request through a message or phone call or the like.

Figure 21:
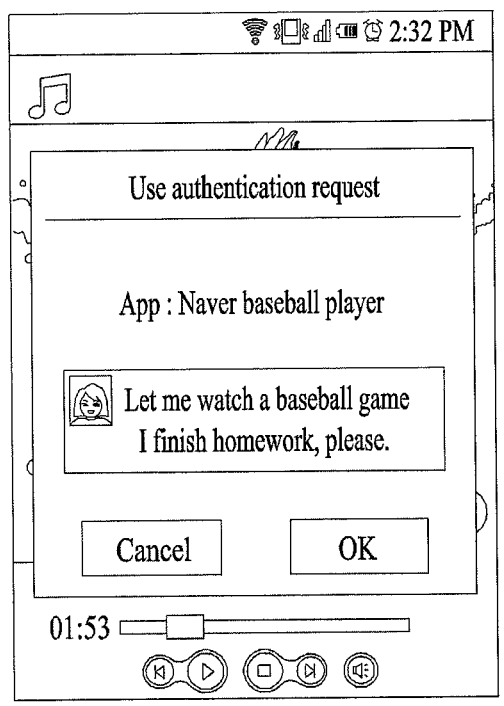
FIG. 21 and FIG. 22 are diagrams illustrating an authentication request message processing protocol in a mobile terminal.
Figure 22:
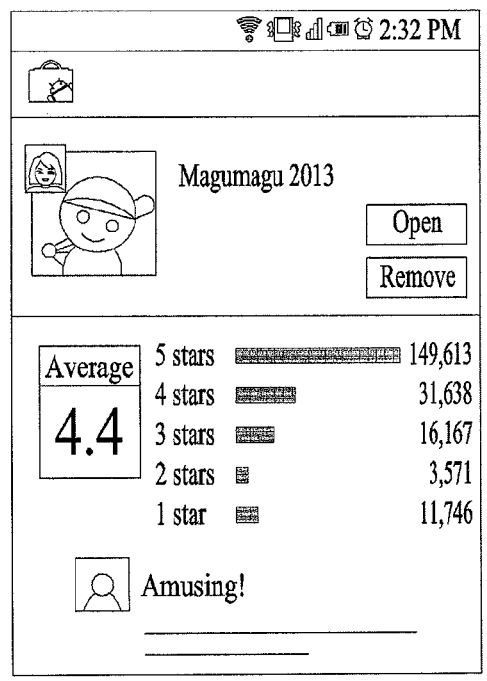

FIGS. 21 and 22 are diagrams illustrating an authentication request message processing protocol in a mobile terminal. Like FIG. 18, FIG. 21 shows a user interface when a slave mobile terminal sends an authentication request message to a master mobile terminal. When a slave mobile terminal makes a request for an authentication message, as mentioned in the foregoing description, FIG. 21 (a) shows an image and the like, which will be provided by overlaying a status information of the slave mobile terminal on transmitting the status information.

FIG. 21 (b) shows one example of a configuration of a master mobile terminal when an authentication request message containing the status information shown in FIG. 21 (a) is received by the master mobile terminal. Referring to FIG. 21 (b), a user authentication request message 2110 is provided to a center of a screen by popping up. In this instance, the popping-up user authentication request message may include an item filled with an attribute, type and name of an application, a detailed authentication request message item, an item for confirmation (OK) and an item for cancellation. In this instance, the status information can be output together with the detailed authentication request message item.

If an OK button item in the authentication request message is selected in FIG. 21, a screen shown in FIG. 22 can be provided. FIG. 22 may show detailed information of an authentication requested application item. Namely, only if the master mobile terminal is aware of detailed information on an application requested by the slave detailed authentication request message item, the master mobile terminal can make a response to the authentication request.

Further, if the master mobile terminal differs from the slave mobile terminal in OS (operating system), version or the like, the corresponding processing may be performed by being different from the above-mentioned description. For instance, although the master mobile terminal and the salve mobile terminal differ from each other in OS or the like, information on a corresponding application can be provided through an internet application or the like. In particular, if it is difficult to directly access an application of the master mobile terminal, a detailed information providing address or location information on a related application for master mobile terminal user's convenience in selection can be provided as a URL form. In FIG. 22, like FIG. 21, a status information icon transmitted by a slave mobile terminal user can be output in order to keep being recognizable in a process for a master mobile terminal user to make a response to a requested message.

Figure 23:
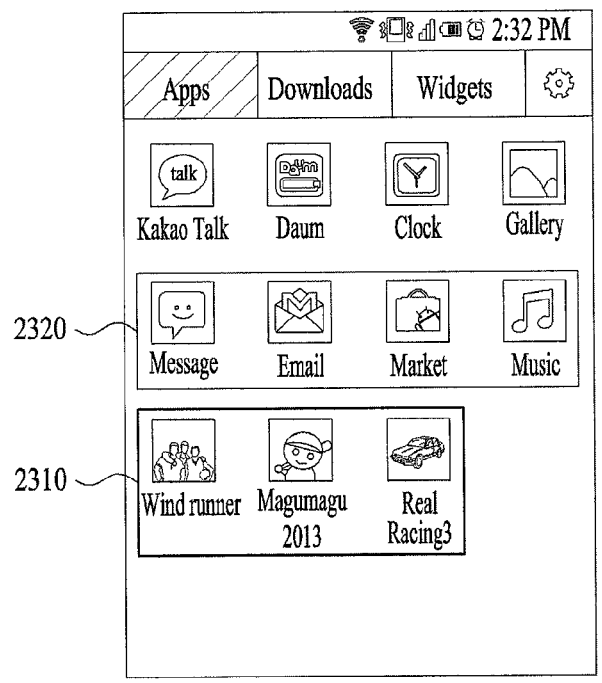
FIG. 23 is a diagram illustrating a method of recommending an application depending on status information in a mobile terminal.

FIG. 23 is a diagram illustrating a method of recommending an application depending on status information in a mobile terminal. FIG. 23 shows one example for recommending an application depending on status information in a mobile terminal, which is described on the assumption of an application recommendation in a slave mobile terminal. Besides, a same or similar method is applicable to a master mobile terminal.

Referring to FIG. 23, if an action of a prescribed user is detected, a slave mobile terminal updates status information by collecting current status information on a user of a master mobile terminal. The slave mobile terminal sorts applications into recommended applications and non-recommended applications depending on the updated status information of the master mobile terminal and then lists up recommended application icons 2310 and non-recommended application icons 2320 according to the sorted applications. Thus, the slave mobile terminal can control the recommended application icons 2310 and the non-recommended application icons 2320 to be provided by being configured as folders.

Further, it can determine 'recommended/non-recommended' in the above description based on a probability of an agreement grant as a response given by the master mobile terminal when an application activation authentication request at a timing point of an action of a slave mobile terminal user. For instance, if a probability of the agreement grant is equal to or greater than 50% at least, it can be regarded as 'recommended'.

The slave mobile terminal can sort the applications by 'recommended/non-recommended' based on a probability of recommendation or non-recommendation when listing up the applications. For instance, the slave mobile terminal arranges an application, which has a highest probability of an agreement grant as a response to an authentication request among the recommended application icons 2310, to the most left side and then arranges the rest of applications to the right in order based on probabilities.

Figure 24:
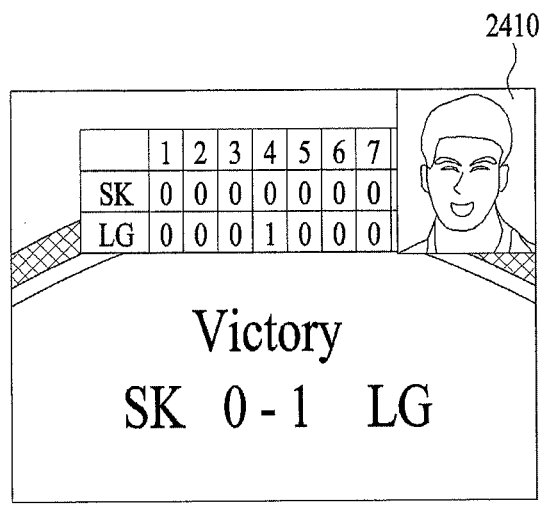
FIG. 24 and FIG. 25 are diagrams illustrating scenarios related to an application deactivation in a mobile terminal.
Figure 25:
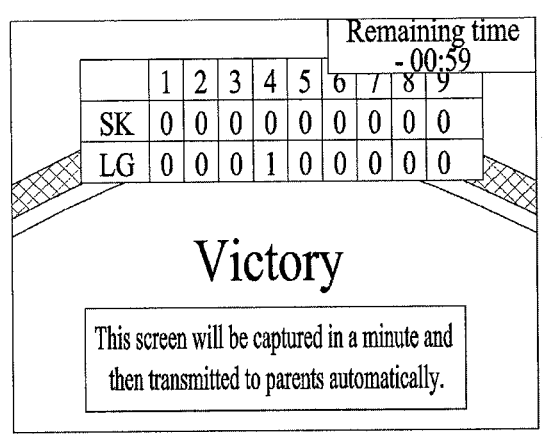

FIGS. 24 and 25 are diagrams illustrating scenarios related to an application deactivation in a mobile terminal. After a slave mobile terminal makes a request for activating an application including information on a use time, if a master mobile terminal grants an agreement in response to the request, FIGS. 24 and 25 are provided illustrating scenarios for a processing method when expiration of the corresponding use time.

Referring to FIG. 24, each of a slave mobile terminal and a master mobile terminal outputs a message 2410, which notifies that the use time will expire in a prescribed time, to a corresponding screen before expiration of the use time by the prescribed time so that the message 2410 can be recognized by a corresponding user. In this instance, such a notification can be performed once only. Alternatively, such a notification can be performed multiple times periodically or aperiodically in a preset time. Thus, at a timing point of outputting a last notification message or an expiration timing point of the use time, the slave mobile terminal can output an icon 2410 for contacting with the master mobile terminal user to a prescribed region of an application activated screen by the icon 2410 overlays the prescribed region. For example, the icon 2410 may include a function icon for entering an email function, a message (e.g., text message) sending function, a voice call function, a video call function or the like.

Referring to FIG. 25, the slave mobile terminal may not stop the corresponding application activation until the corresponding function is entered in response to a selection of the output overlay function icon. Thus, if the output function icon is not selected for a prescribed time, the slave mobile terminal outputs a message 2510 indicating 'This screen will be captured in a minute and then automatically sent to a master mobile terminal.' to lead to a termination of the corresponding application by assigning a prescribed time. In this instance, remaining time information 2520 on the time information can be output to the output message as well. Further, the screen shown in FIG. 25 can be provided ahead of the expiration of the application use agreed time, which is mentioned in the foregoing description, by a prescribed time. In the present specification, the scenario shown in FIG. 25 is provided after the scenario shown in FIG. 24. Yet, the scenario shown in FIG. 24 can be provided after the scenario shown in FIG. 25.

FIG. 26 is a diagram illustrating a processing method depending on an application use termination between mobile terminals. FIG. 26 discloses an operation for a subsequent processing in accordance with the application use termination in the slave mobile terminal and the master mobile terminal through the scenario shown in FIG. 24 or 25.

Referring to FIG. 26 (a), if the application use time is ended or an end timing point approaches like FIG. 24 or FIG. 25, the slave mobile terminal updates status information of the master mobile terminal user or outputs a message received from the master mobile terminal to a prescribed region of the application activated screen by the message overlays the screen.

Thus, the slave mobile terminal can provide a status icon of the master mobile terminal user, as shown in FIG. 26 (a), together with the message. The slave mobile terminal can request an additional authentication by creating a message related to a use time extension based on the updated status information of the master mobile terminal user or the received message 2610.

FIG. 26 (b) shows one example of an agreement in the master mobile terminal when the additional authentication request is made by the slave mobile terminal shown in FIG. 26 (a). In particular, FIG. 26 (b) shows when a termination is requested without granting an additional agreement. Further, the slave mobile terminal can recommend an authentication request scheme to the master mobile terminal user based on the updated status information of the master mobile terminal user or the message received from the master mobile terminal (not shown in the drawing). In this instance, as mentioned in the foregoing description, the authentication request schemes can be provided by being sorted in order of higher agreement grant probability.

FIGS. 27 and 28 are diagrams illustrating a processing method depending on an additional application use authentication between mobile terminals. FIG. 27 shows one example of an additional authentication on a use time separately or in response to a request from a slave mobile terminal while an application of the salve mobile terminal is running in a master mobile terminal or when the application is stopped.

Referring to FIG. 27 (a), a user of a master mobile terminal makes a selection 2710 of a registered slave mobile terminal or a user of the registered slave mobile terminal. Subsequently, referring to FIG. 27 (b), the master mobile terminal creates a message 2720, which is to be sent to the selected slave mobile terminal, in response to the selection and then outputs the created message. Referring to FIG. 28 (a), if the message shown in FIG. 27 (b) is received from the master mobile terminal, the slave mobile terminal provides the received message as a popup to an active screen of the salve mobile terminal and also provides a message window 2810 for a feedback of the message.

If the additional use agreement message is accepted and a feedback message is sent in FIG. 28 (a), referring to FIG. 28 (b), the slave mobile terminal gives a notification 2820, which notifies that the use time is extended, to the screen. Thus, the slave mobile terminal can provide currently remaining time information attributed to the extension as well. Moreover, the notification related to the extension and the remaining time information containing the additional time are fed back to the master mobile terminal so as to be recognized by the master mobile terminal user.

FIGS. 29 and 30 are diagrams illustrating a scenario for a conditional authentication request or a conditional agreement grant when an authentication request or an agreement grant in mobile terminals. FIG. 29 shows one example of a conditional agreement request. In addition, FIG. 30 shows one example of a conditional agreement. Referring to FIG. 29 (a), a user of a slave mobile terminal creates a conditional message such as 'Let me watch a baseball game if finishing a homework.' through a message window 2910 and can then send the created message to a master mobile terminal. Thus, the message can include an application title related to the message and the like.

Referring to FIG. 29 (b), if the condition contained in the conditional message shown in FIG. 29 (a) is met, the user of the slave mobile terminal composes a completed condition and authentication request message through a message window 2920 and can then send the composed message. In this instance, the message can include data of image, video, audio and the like, which proves the completed condition, as an attached file.

Referring to FIG. 30, if a message for an application activation request and the like is received from a slave mobile terminal, a user of a master mobile terminal outputs the received message through a message window 3010. In this instance, the message window 3010 may include an agreement requested application item 3011, an agreement request message window 3012, a condition adding item 3013 of the master mobile terminal user, an agreement request grant item 3014 and an agreement request denial item 3015. Referring to FIG. 30 (b), a message window 3020 is provided if the master mobile terminal user selects the condition adding item 3013 of the message window 3010. Through the message window 3020, the master mobile terminal user can agree or deny by adding a condition.

Figure 31:
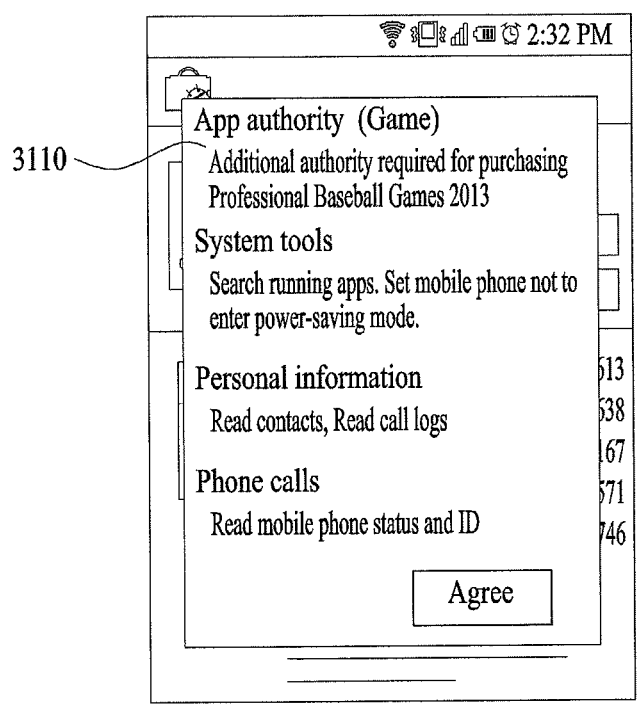

FIGS. 31 and 32 are diagrams illustrating a process for controlling an application in the aforementioned master-slave device registered mobile terminals. FIG. 31 shows on example of authority setting for a corresponding application control in accordance with the master-slave device registration when an application is installed.

Referring to FIG. 31, a message window 3110 is a screen provided when an application is downloaded. In this instance, it can change authority setting information of an application registered between master-slave devices. If mobile terminals are registered as master-slave devices, each of the mobile terminals can change corresponding authority information setting in installing an application depending on whether the corresponding mobile terminal corresponds to the master device or the slave device. For instance, when an application is installed on a device, if an operating system (OS) of the corresponding device is Android, a message window 3110 is provided by a file AndroidManifest.xml. Further, the file AndroidManifest.xml defines class types of the corresponding applications into game, education, video, music, SNS and the like.

When mobile terminals are registered as master-slave mobile terminals, each of the mobile terminals previously designates or controlling an application class of the file AndroidManifest.xml depending on a corresponding role or function. Hence, when an application is installed on or activated in the corresponding mobile terminal, the corresponding application class can be referred to.

As mentioned in the foregoing description, an application is installed and activated in a slave mobile terminal through a file AndroidManifest.xml. In this instance, a master mobile terminal receives information on an application activated or used by a corresponding user relatively many times (e.g., relatively high count of activations, relatively long time of use, etc.) from the slave AndroidManifest.xml and then provides the received information as shown in FIG. 32.

Referring to FIG. 32 (a), as mentioned in the above description, a master terminal outputs the information on the application, which has the relatively high count of activations or the relatively long time of use in a slave mobile terminal, through a message window 3210. In this instance, it can link to a search page through the message window 3210 to recognize a type of the corresponding application.

For instance, if application 'magumagu 2013' shown in FIG. 32 (*a*) is the application that has been recently used at a relatively high frequency of use by the slave mobile terminal, a user of the master mobile terminal may not be aware of the corresponding application. Hence, in order to facilitate acquisition of information on the corresponding application, referring to FIG. 32 (*b*), it can link to an application download screen, related application information providing page and the like.

Further, although various embodiments of the technical idea of the present invention are described in the present specification by taking the master-slave registration as an example, they are similarly applicable to data communications between mobile terminals paired with each other without the master-slave registration.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely and are not to be considered as limiting the present invention. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A method of processing data in a first mobile terminal, the method comprising:
    registering, via a controller of the first mobile terminal, a second mobile terminal as a master device and the first terminal as a slave device;
    storing, via a memory associated with the first mobile terminal, status information indicating previous success or non-success of receiving a positive response from the second mobile terminal for a request to activate an application on the first mobile terminal;
    transmitting, via a wireless communication unit of the first mobile terminal, an application activation request signal to the second mobile terminal based on the stored status information;
    receiving, via the wireless communication unit, a response signal corresponding to the application activation request signal from the second mobile terminal; and
    activating, via the controller, the application in response to the received response signal.

2. The method of claim 1, wherein the master device is registered by software execution.

3. The method of claim 1, wherein the status information corresponds to signal history data received from the second mobile terminal before the transmission of the application activation request signal.

4. The method of claim 1, wherein the status information corresponds to interactive data with the second mobile terminal before the transmission of the application activation request signal.

5. The method of claim 1, wherein the status information corresponds to sensing information of a wearable device of a user of the second mobile terminal before the transmission of the application activation request signal.

6. The method of claim 1, wherein the status information corresponds to a combination of at least one of signal history data received from the second mobile terminal, an interactive data with the second mobile terminal and sensing information of a wearable device of a user of the second mobile terminal before the transmission of the application activation request signal.

7. The method of claim 1, wherein the transmitting the application activation request signal further comprises determining a type of the application activation request signal from a plurality of application activation request signal types based on the stored status information.

8. The method of claim 7, wherein the determined type of the application activation request signal includes one of an MMS (Multimedia Message Service), an email, a voice call and a video call.

9. The method of claim 1, wherein the receiving the response signal further comprises performing at least one of overlaying image data a corresponding application icon output to a screen, changing an outline color, changing an outline color of the corresponding application icon output to the screen, and 3-dimensionally displaying the corresponding application icon output to the screen.

10. The method of claim 1, wherein the status information is collected from at least one of a manufacturer provided server and a cloud server.

11. A first mobile terminal, processing data with a second mobile terminal registered as a master device, the first mobile terminal comprising:
    a wireless communication unit configured to wirelessly communicate with the second mobile terminal; and
    a controller configured to:
    register the second mobile terminal as a master device and the first terminal as a slave device,
    store, via a memory associated with the first mobile terminal, status information indicating previous success or non-success of receiving a positive response from the second mobile terminal for a request to activate an application on the first mobile terminal,
    transmit, via the wireless communication unit, an application activation request signal to the second mobile terminal based on the stored status information,
    receive a response signal corresponding to the application activation request signal from the second mobile terminal, and
    activate the application in response to the received response signal.

12. The mobile terminal of claim 11, wherein the controller is further configured to register the master device by executing software.

13. The mobile terminal of claim 11, wherein the status information corresponds to signal history data received from the second mobile terminal before the transmission of the application activation request signal.

14. The mobile terminal of claim 11, wherein the status information corresponds to interactive data with the second mobile terminal before the transmission of the application activation request signal.

15. The mobile terminal of claim 11, wherein the status information corresponds to sensing information of a wearable device of a user of the second mobile terminal before the transmission of the application activation request signal.

16. The mobile terminal of claim 11, wherein the status information corresponds to a combination of at least one of a signal history data received from the second mobile terminal, an interactive data with the second mobile terminal and sensing information of a wearable device of a user of the second mobile terminal before the transmission of the application activation request signal.

17. The mobile terminal of claim 11, wherein if transmitting the application activation request signal containing the created status information to the second mobile terminal, the controller is further configured to determine a type of the application activation request signal from a plurality of application activation request signal types based on the status information, and wherein the determined type of the application activation request signal comprises one of at least one of an MMS (Multimedia Message Service), an email, a voice call and a video call.

18. The mobile terminal of claim 11, wherein if receiving the response signal corresponding to the application activation request signal from the second mobile terminal, the controller is further configured to perform at least of overlaying image data a corresponding application icon output to a screen, changing an outline color, changing an outline color of the corresponding application icon output to the screen, and 3-dimensionally displaying the corresponding application icon output to the screen.

19. The mobile terminal of claim 11, wherein the status information is received from at least one of a manufacturer provided server and a cloud server.

20. A mobile communication system processing data between a plurality of mobile terminals, the mobile communication system comprising:
   a first mobile terminal registered as a slave device through software execution;
   a second mobile terminal registered as a master device through the software execution; and
   a communication server transmitting and receiving the data between the first mobile terminal and the second mobile terminal,
   wherein the first mobile terminal further comprises:
   a wireless communication unit configured to wirelessly communicate with the second mobile terminal; and
   a controller configured to:
   register the second mobile terminal as a master device and the first terminal as a slave device,
   store, via a memory associated with the first mobile terminal, status information indicating previous success or non-success of receiving a positive response from the second mobile terminal for a request to activate an application on the first mobile terminal,
   transmit, via the wireless communication unit, an application activation request signal to the second mobile terminal based on the stored status information,
   receive a response signal corresponding to the application activation request signal from the second mobile terminal, and
   activate the application in response to the received response signal.

* * * * *